(12) United States Patent
Xu et al.

(10) Patent No.: US 11,825,030 B2
(45) Date of Patent: Nov. 21, 2023

(54) INTRA BLOCK COPY MODE WITH DUAL TREE PARTITION

(71) Applicants: Beijing Bytedance Network Technology Co., Ltd., Beijing (CN); Bytedance Inc., Los Angeles, CA (US)

(72) Inventors: Jizheng Xu, San Diego, CA (US); Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 235 days.

(21) Appl. No.: 17/353,612

(22) Filed: Jun. 21, 2021

(65) Prior Publication Data

US 2021/0314610 A1    Oct. 7, 2021

Related U.S. Application Data

(63) Continuation of application No. PCT/CN2019/127478, filed on Dec. 23, 2019.

(30) Foreign Application Priority Data

Dec. 2, 2018   (WO) ................ PCT/CN2018/122953
Dec. 29, 2018  (WO) ................ PCT/CN2018/125403
Jan. 2, 2019   (WO) ................ PCT/CN2019/070149

(51) Int. Cl.
   *H04N 19/52*   (2014.01)
   *H04N 19/593*  (2014.01)
   (Continued)

(52) U.S. Cl.
   CPC ......... *H04N 19/593* (2014.11); *H04N 19/176* (2014.11); *H04N 19/184* (2014.11); *H04N 19/96* (2014.11)

(58) Field of Classification Search
   CPC .. H04N 19/593; H04N 19/176; H04N 19/184; H04N 19/96
   (Continued)

(56) References Cited

U.S. PATENT DOCUMENTS 9,749,645 B2   8/2017   Li et al.
9,860,559 B2   1/2018   Zhang et al.
(Continued)

FOREIGN PATENT DOCUMENTS

CN    101610417 A    12/2009
CN    104380737 A     2/2015
(Continued)

OTHER PUBLICATIONS

Bross et al. "High Efficiency Video Coding (HEVC) Text Specification Draft 6," Joint Collaborative Team on Video Coding (JCT-VC) of ITU-T SG16 WP3 and ISO/IEC JTC1/SC29/WG11, 8th Meeting: San Jose CA, USA, Feb. 1-10, 2012, JCTVC-H1003, 2012.
(Continued)

*Primary Examiner* — Nguyen T Truong
(74) *Attorney, Agent, or Firm* — Perkins Coie LLP

(57) ABSTRACT

The application relates to an intra block copy mode with dual tree partition. A method of video processing is disclosed. The method of video processing includes: determining, during a conversion between a current video block and a bitstream representation of the current video block, a block vector for the current video block; and performing, at least based on the block vector, the conversion, wherein when the current video block is coded with a coding mode using a reference block for prediction pointing to a same picture that the current video block is located in, and the current video block is a first type of block, the block vector is derived from at least one second type of block.

20 Claims, 21 Drawing Sheets

Current picture

(51) Int. Cl.
  *H04N 19/176* (2014.01)
  *H04N 19/184* (2014.01)
  *H04N 19/96* (2014.01)
(58) Field of Classification Search
  USPC .................................................. 375/240.12
  See application file for complete search history.

(56) References Cited

U.S. PATENT DOCUMENTS

| | | | |
|---|---|---|---|
| 9,877,043 | B2 | 1/2018 | He et al. |
| 10,178,403 | B2 | 1/2019 | Seregin et al. |
| 10,264,271 | B2 | 4/2019 | Li et al. |
| 10,284,874 | B2 | 5/2019 | He et al. |
| 10,412,387 | B2 | 9/2019 | Pang et al. |
| 10,516,882 | B2 | 12/2019 | He et al. |
| 10,582,213 | B2 | 3/2020 | Li et al. |
| 10,735,749 | B2 | 8/2020 | Li et al. |
| 2013/0208792 | A1 | 8/2013 | He et al. |
| 2013/0272375 | A1 | 10/2013 | Yu et al. |
| 2013/0294524 | A1 | 11/2013 | Van Der Auwera et al. |
| 2014/0192862 | A1 | 7/2014 | Flynn et al. |
| 2015/0181237 | A1 | 6/2015 | Tsukuba et al. |
| 2015/0373359 | A1 | 12/2015 | He et al. |
| 2016/0088314 | A1 | 3/2016 | Song et al. |
| 2016/0100175 | A1 | 4/2016 | Laroche et al. |
| 2016/0100189 | A1 | 4/2016 | Pang et al. |
| 2016/0105670 | A1 | 4/2016 | Pang et al. |
| 2016/0105682 | A1 | 4/2016 | Rapaka et al. |
| 2016/0150230 | A1 | 5/2016 | He |
| 2016/0360205 | A1 | 12/2016 | Chang et al. |
| 2017/0054996 | A1 | 2/2017 | Xu et al. |
| 2017/0094271 | A1 | 3/2017 | Liu et al. |
| 2017/0142418 | A1 | 5/2017 | Li et al. |
| 2017/0180737 | A1 | 6/2017 | Ye et al. |
| 2017/0289566 | A1 | 10/2017 | He et al. |
| 2017/0289572 | A1 | 10/2017 | Ye et al. |
| 2017/0302935 | A1 | 10/2017 | Li et al. |
| 2017/0339404 | A1 | 11/2017 | Panusopone et al. |
| 2018/0063525 | A1 | 3/2018 | Kim et al. |
| 2018/0063547 | A1 | 3/2018 | Kobayashi |
| 2018/0124394 | A1 | 5/2018 | Xu et al. |
| 2018/0234699 | A1 | 8/2018 | Xu et al. |
| 2018/0302645 | A1 | 10/2018 | Laroche et al. |
| 2018/0338144 | A1 | 11/2018 | Nam et al. |
| 2019/0200038 | A1 | 6/2019 | He et al. |
| 2019/0246143 | A1 | 8/2019 | Zhang et al. |
| 2020/0077087 | A1 | 3/2020 | He et al. |
| 2020/0154127 | A1 | 5/2020 | Lee |
| 2020/0336748 | A1 | 10/2020 | Li et al. |
| 2020/0396465 | A1 | 12/2020 | Zhang et al. |
| 2020/0404255 | A1 | 12/2020 | Zhang et al. |
| 2020/0404260 | A1 | 12/2020 | Zhang et al. |
| 2020/0413048 | A1 | 12/2020 | Zhang et al. |
| 2021/0021811 | A1 | 1/2021 | Xu et al. |

FOREIGN PATENT DOCUMENTS

| | | |
|---|---|---|
| CN | 104837025 A | 8/2015 |
| CN | 105532000 A | 4/2016 |
| CN | 105659602 A | 6/2016 |
| CN | 106464905 A | 2/2017 |
| CN | 106797477 A | 5/2017 |
| CN | 107852499 A | 3/2018 |
| CN | 113170195 A | 7/2021 |
| IN | 201647039082 A | 12/2016 |
| KR | 20140039093 A | 4/2014 |
| WO | 2015180014 A1 | 12/2015 |
| WO | 2015180166 A1 | 12/2015 |
| WO | 2017206803 A1 | 12/2017 |

OTHER PUBLICATIONS

Chen et al. "Algorithm Description for Versatile Video Coding and Test Model 3 (VTM 3)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L1002, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0366, 2018.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0337, 2018.

"ITU-T H.265 ""High efficiency video coding"" Series H: Audio-visual and Multimedia SystemsInfrastructure of audiovisual services—Coding of movingvideo, Telecommunicationstandardization Sectorof ITU, Available at address: https://www.itu.int/rec/T-REC-H.265 (Nov. 2019)."

Li et al. "Description of SDR Video Coding Technology Proposal by Tencent," Joint Video Experts Team (JVET) of ITU-T SG 16 WP 3 and ISO/IEC JTC 1/SC 29/WG 11, 10th Meeting: San Diego, US, Apr. 10-20, 2018, document JVET-J0029, 2018.

Nam et al. "Non-CE8: Block Vector Predictor for IBC," Joint Video Experts Team (JVET) of ITU-T SG 16 WP 3 and ISO/IEC JTC 1/SC 29/WG 11, 12th Meeting: Macau, CN, Oct. 8-12, 2018, document JVET-L0159rl, 2018.

Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R, 2014.

Xu et al. "Intra Block Copy in HEVC Screen Content Coding Extensions," IEEE Journal on Emerging and Selected Topics in Circuits and Systems, Dec. 2016, 6(4):409-418.

International Search Report and Written Opinion from International Patent Application No. PCT/CN2019/121642 dated Jan. 23, 2020 (9 pages).

International Search Report and Written Opinion from International Patent Application No. PCT/CN2019/121643 dated Feb. 28, 2020 (10 pages).

International Search Report and Written Opinion from International Patent Application No. PCT/CN2019/121646 dated Feb. 19, 2020 (10 pages).

International Search Report and Written Opinion from International Patent Application No. PCT/CN2019/127478 dated Mar. 30, 2020 (10 pages).

Non-Final Office Action from U.S. Appl. No. 17/031,049 dated Nov. 13, 2020.

Final Office Action from U.S. Appl. No. 17/031,049 dated Feb. 26, 2021.

Final Office Action from U.S. Appl. No. 17/031,049 dated Jul. 5, 2022.

Gao et al. "AHG11: New Signalling Mechanism for Lossless Coding," Joint Collaborative Team on Video Coding (JCT-VC)of ITU-T SG 16 WP 3 and ISO/IEC JTC 1/SC 29/WG 1110th Meeting: Stockholm, SE, Jul. 11-20, 2012, document JCTVC-J0340 and JCTVC-J0340r2, 2012. (CN201980077071.2 dated Sep. 12, 2023).

Non-Final Office Action from U.S. Appl. No. 17/960,648 dated Sep. 28, 2023.

INTRA BLOCK COPY MODE WITH DUAL TREE PARTITION

CROSS REFERENCE TO RELATED APPLICATIONS

This application is a continuation of International Patent Application No. PCT/CN2019/127478, filed on Dec. 23, 2019, which claims the priority to and benefits of International Patent Applications No. PCT/CN2018/122953, filed on Dec. 22, 2018, No. PCT/CN2018/125403, filed on Dec. 29, 2018, and No. PCT/CN2019/070149, filed on Jan. 2, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments during video decoding or encoding using intra-picture video coding tools such as current picture referencing (CPR) coding tools.

In one example aspect, a method of video processing is disclosed. The method includes applying, for a conversion between a current video block and a bitstream representation of the current video block, an intra coding tool or an inter coding tool to the current video block of a current video picture by which the current video block is referenced from a reference video block that is at least partly in the current video picture, determining one or more padding values during the conversion, wherein the one or more padding values are signaled in the bitstream representation, and performing the conversion using the one or more padding values and the intra coding tool or the inter coding tool.

In yet another example aspect, another method of video processing is disclosed. The method includes determining an intra candidate list for intra coding mode of a current video block during a conversion between the current video block and a bitstream representation of the current video block, and performing, using the intra candidate list, the conversion between the current video block and the bitstream representation, where the intra candidate list for intra coding mode is different from a candidate list for an inter-coding mode of the current video block, where the candidate list is one of a merge list or a history based motion vector predictor list or an affine merge list.

In yet another example aspect, another method of video processing is disclosed. The method includes performing a determination that a coding mode for a current video block is a transquant bypass coding mode in which the current video block is encoded into a bitstream representation by omitting a transform step and a quantization step and performing, based on the determination, a conversion between the current video block and the bitstream representation according to the transquant bypass coding mode, wherein the conversion is performed without filtering based on an adaptive loop filter.

In yet another example aspect, another method of video processing is disclosed. The method includes determining that a block vector of a current video block, which is a chroma block, cannot be derived based on a luma block in a collocated luma region of the current video block, selecting, based on the determining, a default block vector as the block vector of the chroma block, and performing, based on the block vector, a conversion between the current video block and a bitstream representation of the current video block.

In yet another example aspect, another method of video processing is disclosed. The method includes: determining, during a conversion between a current block and a bitstream representation of the current block, one or more padding values; and performing, at least based on the one or more padding values, the conversion.

In yet another example aspect, another method of video processing is disclosed. The method includes: determining, during a first conversion between a first video block of a video and a bitstream representation of the video, a first candidate list construction method for the first video block with a first coding mode; performing, at least based on a first candidate list acquired according to the first candidate list construction method, the first conversion; wherein the conversion of the first video block is based on samples in current picture, and the first candidate list construction method is different from a second candidate list construction method which is applied, during a second conversion between a second video block with a second coding mode of the video and the bitstream representation of the video, on the second video block.

In yet another example aspect, another method of video processing is disclosed. The method includes: determining, during a conversion between a current block and a bitstream representation of the current block, that the current block is coded in a transquant bypass coding mode; and performing the conversion between the current block and a bitstream representation of the current block without filtering based on an adaptive loop filter in response to the current block being coded in the transquant bypass coding mode, wherein the transquant bypass coding mode is a coding mode in which a block is coded without one or more of a transform, a quantization and an in-loop filtering.

In yet another example aspect, another method of video processing is disclosed. The method includes: performing a processing, during a conversion between a current block and a bitstream representation of the current block, of one or more transquant bypass flags based on color components of the current block, wherein the transquant bypass flag relates with a transquant bypass coding mode, wherein the transquant bypass coding mode is a coding mode in which a block is coded without one or more of a transform, a quantization and an in-loop filtering; performing the conversion based on the processing.

In yet another example aspect, another method of video processing is disclosed. The method includes: determining, during a conversion between a current video block and a bitstream representation of the current video block, a block vector for the current video block; and performing, at least based on the block vector, the conversion, wherein when the current video block is coded with a coding mode using a reference block for prediction pointing to a same picture that the current video block is located in, and the current video block is a first type of block, the block vector is derived from at least one second type of block.

In another example aspect, another method of video processing is disclosed. The method includes: determining, during a conversion between a current video block and a bitstream representation of the current video block, a reference sample for the current video block; and performing, at least based on the block vector, the conversion, wherein when the current video block is coded with a coding mode using a reference block for prediction pointing to a same picture that the current video block is located in, and the reference sample comprises the top-left and bottom-right sample of the current video block identified by a block vector of current video block.

In yet another example embodiment, a video encoder apparatus is disclosed. The encoder apparatus includes a processor configured to implement an above-described method.

In yet another aspect, a video decoder apparatus is disclosed. The video decoder apparatus includes a processor configured to implement an above-described method.

In yet another aspect, a computer-readable program medium is disclosed. The medium includes code. The code includes processor-executable instructions for implementing an above-described method.

These, and other, aspects are described in the present document.

DETAILED DESCRIPTION

The present document provides various techniques that can be used by a decoder of video bitstreams to improve the quality of decompressed or decoded digital video or images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Introductory Comments

This patent document is related to video coding technologies. Specifically, it is related to current picture referencing coding mode and some methods could be extended to conventional inter coding mode in video coding. It may be applied to the existing video coding standard like HEVC, or the standard (Versatile Video Coding) to be finalized. It may be also applicable to future video coding standards or video codec.

2. Description

2.1 Current Picture Referencing

Current Picture Referencing (CPR), or once named as Intra Block Copy (IBC) has been adopted in HEVC Screen Content Coding extensions (HEVC-SCC) [1] and the current VVC test model. IBC extends the concept of motion compensation from inter-frame coding to intra-frame coding. As demonstrated in FIG. 1, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

Figure 1:
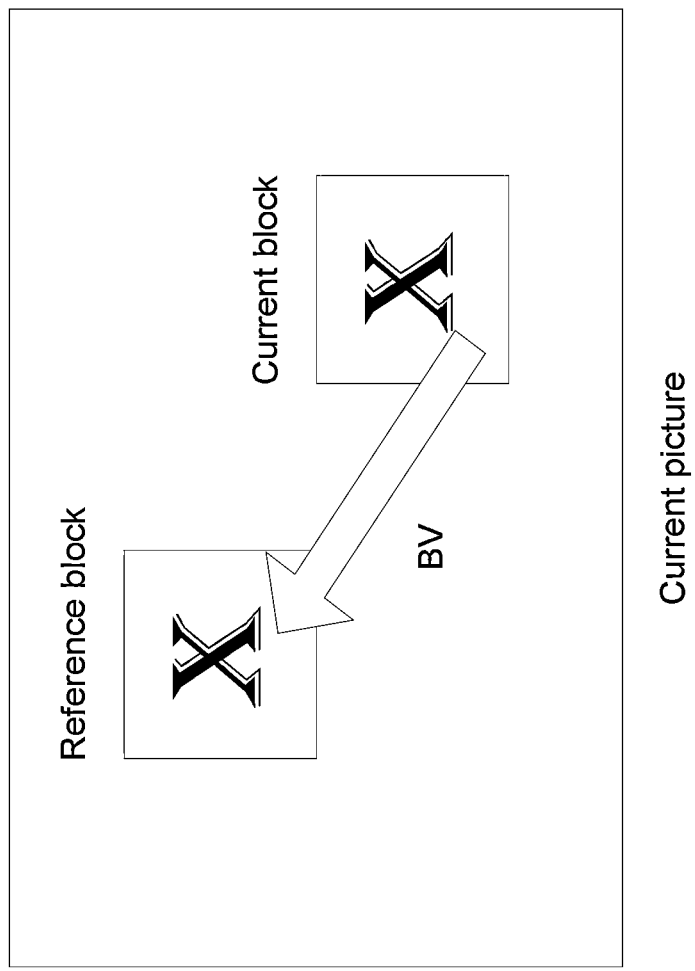
FIG. 1 shows an example illustration of Current Picture Referencing (CPR).

FIG. 1 shows an example illustration of Current Picture Referencing.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 CPR in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

offsetX=
    (ChromaArrayType==0)?0:(mvCLX[0]&0x7?2:0)     (8-104)

offsetY=
    (ChromaArrayType==0)?0:(mvCLX[1]&0x7?2:0)     (8-105)

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal so (xPb+(mvLX[0]>>2)-offsetX, yPb+(mvLX[1]>>2)-offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both of the following conditions shall be true:
    The value of (mvLX[0]>>2)+nPbW+xB1+offsetX is less than or equal to 0.
    The value of (mvLX[1]>>2)+nPbH+yB1+offsetY is less than or equal to 0.

The following condition shall be true:

(xPb+(mvLX[0]>>2)+nPbSw−1*offsetX)/CtbSizeY−
    xCb/CtbSizeY<=yCb/CtbSizeY−(yPb+
    (mvLX[1]>>2)+nPbSh−1+offsetY)/CtbSizeY     (8-106)

Thus, the case that the reference block overlaps with the current block or the reference block is outside of the picture will not happen. There is no need to pad the reference or prediction block.

2.3 CPR in VVC Test Model

In the current VVC test model, the whole reference block should be with the current coding tree unit (CTU) and does not overlap with the current block. Thus, there is no need to pad the reference or prediction block.

When dual tree is enabled, the partition structure may be different from luma to chroma CTUs. Therefore, for the 4:2:0 colour format, one chroma block (e.g., CU) may correspond to one collocated luma region which have been split to multiple luma CUs.

The chroma block could only be coded with the CPR mode when the following conditions shall be true:
1) Each of the luma CU within the collocated luma block shall be coded with CPR mode
2) Each of the luma 4×4 block' BV is firstly converted to a chroma block's BV and the chroma block's BV is a valid BV.

If any of the two condition is false, the chroma block shall not be coded with CPR mode.

It is noted that the definition of 'valid BV' has the following constraints:
1) All samples within the reference block identified by a BV shall be within the restricted search range (e.g., shall be within the same CTU in current VVC design).
2) All samples within the reference block identified by a BV have been reconstructed.

2.4 Padding for CPR/IBC Coding Mode

During the development of CPR/IBC for HEVC, several methods were proposed to handle the undefined pixel value issue using padding.

2.4.1 Preset of Mid-Grey Value

In some embodiments, when a pixel value in a reference block is not defined, it is inferred to be 128, i.e. the mid-grey value in the 8-bit video signal representation.

2.4.2 Horizontally Padding

In some embodiments, when a pixel is undefined due to overlapping with the current block, it is padded with horizontally available pixel. Some embodiments further applies the method to handle pixels outside of picture.

Figure 2:
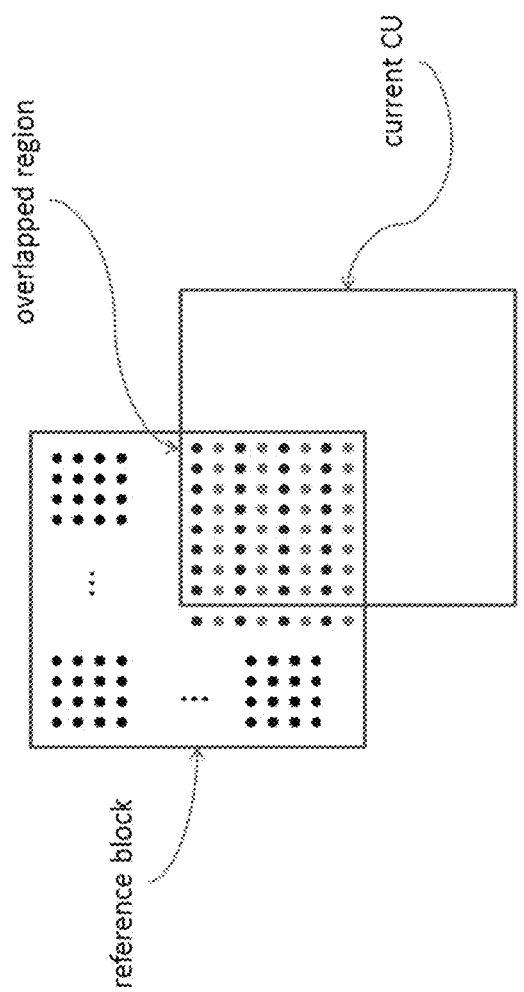
FIG. 2 shows an example illustration of horizontally padding.

FIG. 2 shows an example illustration of horizontally padding.

2.4.3 Horizontally or Vertically Padding Depending on BVx and BVy Values

When |BVy|>|BVx|, vertically padding is applied. Otherwise, horizontally padding is applied.

2.4.4 Padding Along BV

In some embodiments, when padding is needed for a pixel, it will use BV to find a pixel in the valid area and use its value as the padding value.

2.4.5 Padding with a CU/CTU-Level Value Derived from Neighbouring Samples by Histogram or Long-Run In some embodiments, two padding methods are proposed using the neighboring pixels. One is to calculate the histogram of neighboring pixels and pick the most frequent value as the padding value. Some embodiments propose a similar method. The other one is to calculate the longest connected pixel values in neighboring area and use that value as the padding value. The padding thus needs much computation, which places a potential burden to decoding for each CU.

2.5 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 1, the affine motion field of the block is described by two control point motion vectors.

Figure 3:
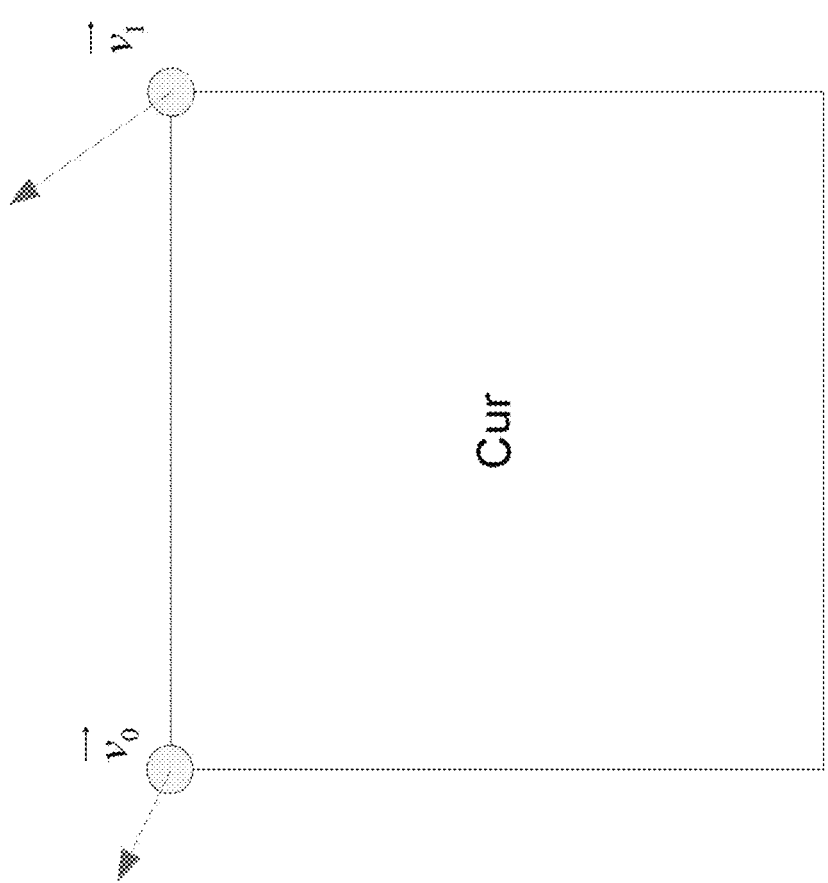
FIG. 3 shows an example of a simplified affine motion model.

FIG. 3 shows an example of a simplified affine motion model.

The motion vector field (MVF) of a block is described by the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 4:
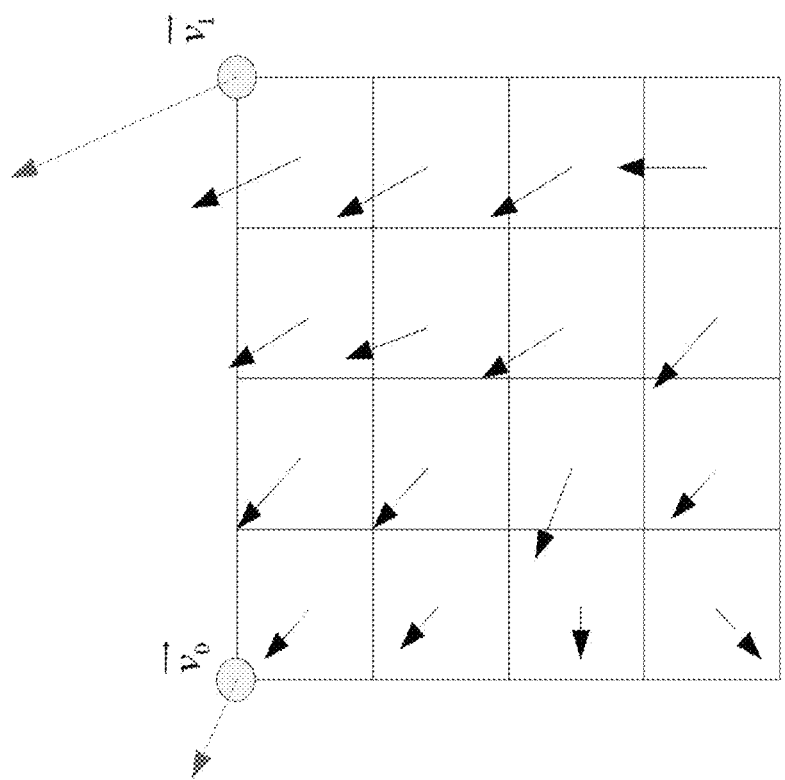
FIG. 4 shows an example of affine MVF per sub-block.

To derive motion vector of each M×N sub-block, the motion vector of the center sample of each sub-block, as shown in FIG. 4, is calculated according to Equation 1, and rounded to 1/16 fraction accuracy.

FIG. 4 shows an example of affine MVF per sub-block.

After MCP, the high accuracy motion vector of each sub-block is rounded and saved as the same accuracy as the normal motion vector.

2.5.1 AF_INTER Mode

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown FIG. 6, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 5B:
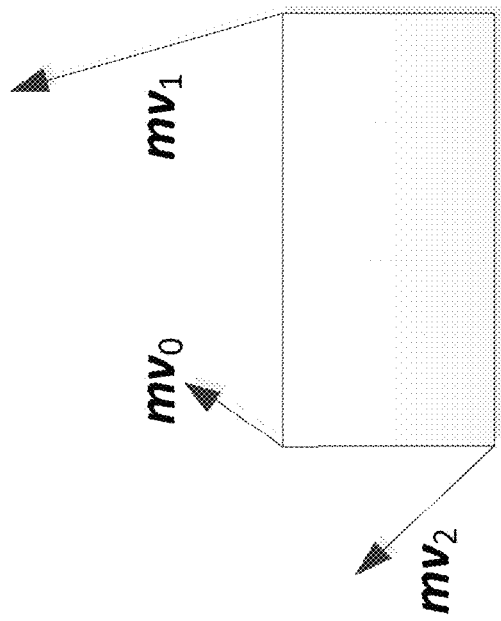
FIG. 5B shows an example of a 6-parameter affine model.
Figure 5A:
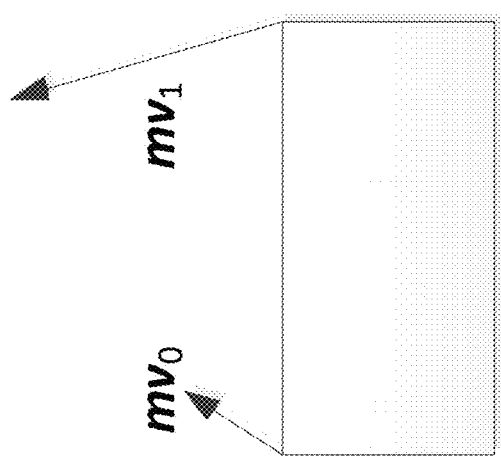
FIG. 5A shows an example of a 4-parameter affine model.

FIG. 5A shows an example of a 4-parameter affine model. FIG. 5B shows an example of a 6-parameter affine model.

Figure 6:
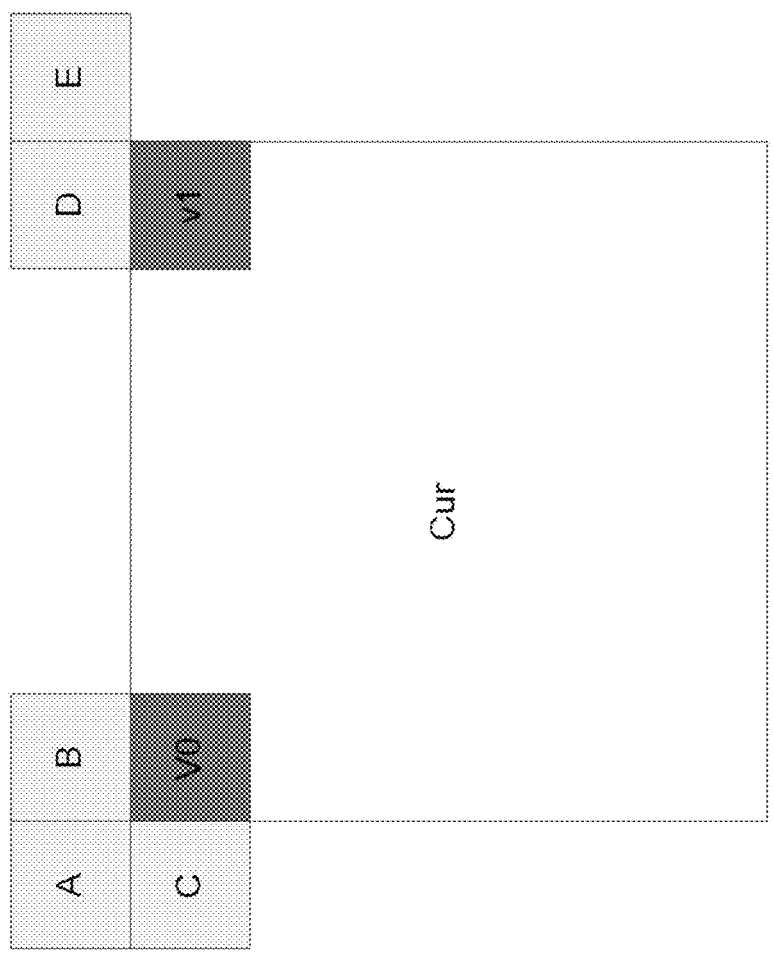
FIG. 6 shows an example of a MVP for AF_INTER mode.

FIG. 6 shows an example of a MVP for AF_INTER mode.

In AF_INTER mode, when 4/6 parameter affine mode is used, 2/3 control points are required, and therefore 2/3 MVD needs to be coded for these control points, as shown in FIG. 6. In some embodiments, it is proposed to derive the MV as follows, i.e., mvd1 and mvd2 are predicted from mvd0.

$$mv_0=\overline{mv}_0+mvd_0$$

$$mv_1=\overline{mv}_1+mvd_1+mvd_0$$

$$mv_2=\overline{mv}_2+mvd_2+mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 5B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.5.2 AF_MERGE Mode

Figure 7A:
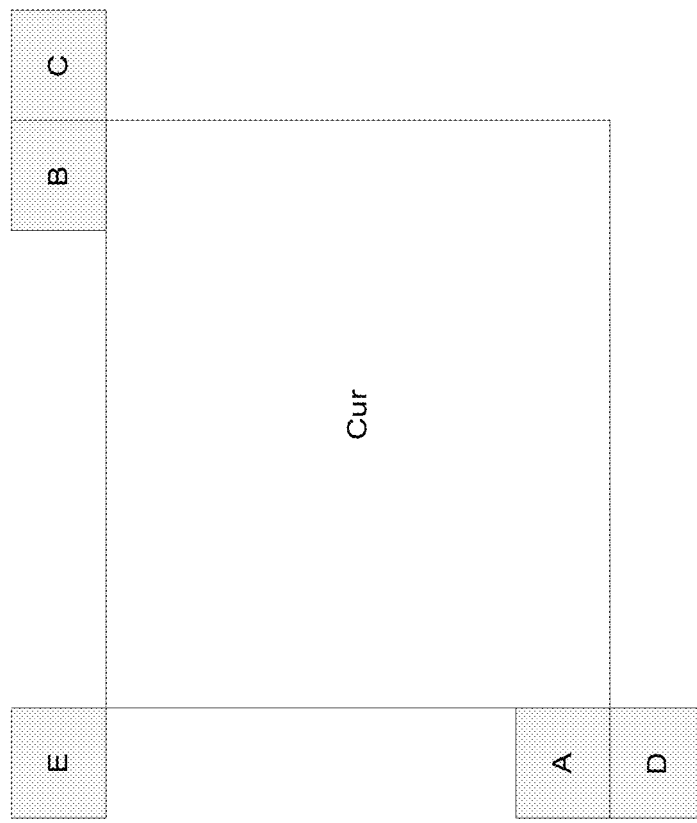
FIGS. 7A and 7B show examples of candidates for AF_MERGE mode.
Figure 7B:
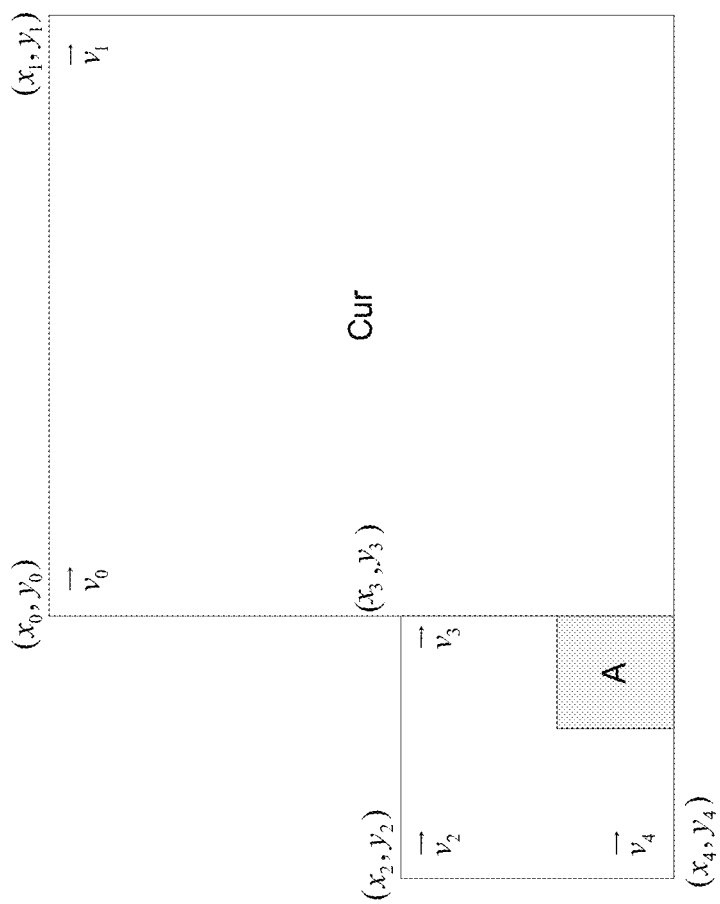

When a CU is applied in AF_MERGE mode, it gets the first block coded with affine mode from the valid neighbour reconstructed blocks. And the selection order for the candidate block is from left, above, above right, left bottom to above left as shown in FIG. 7A If the neighbour left bottom block A is coded in affine mode as shown in FIG. 7B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

FIGS. 7A and 7B show examples of candidates for AF_MERGE mode.

In some embodiments, an affine merge candidate list is constructed with following steps:

1) Insert inherited affine candidates

Figure 8:
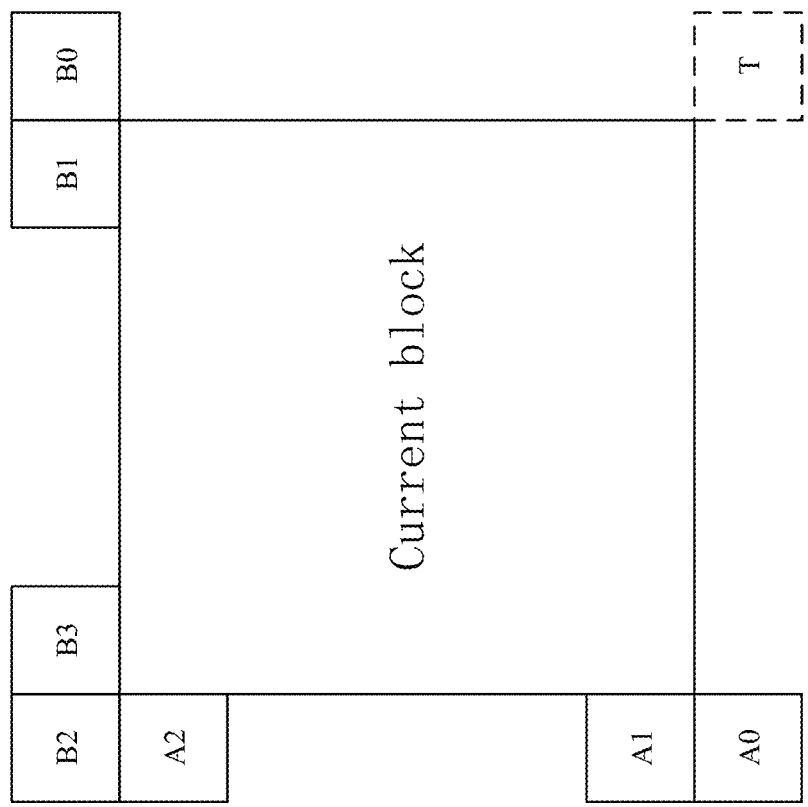
FIG. 8 shows examples of candidates position for affine merge mode.

Inherited affine candidate means that the candidate is derived from the affine motion model of its valid neighbor affine coded block. In the common base, as shown in FIG. 8, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert constructed affine candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 8. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 8 shows examples of candidates position for affine merge mode.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with zero motion vectors
4) If the number of candidates in affine merge candidate list is less than 5, zero motion vectors with zero reference indices are insert into the candidate list, until the list is full.

2.6 Merge

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.
3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.7 ATMVP

Figure 9:
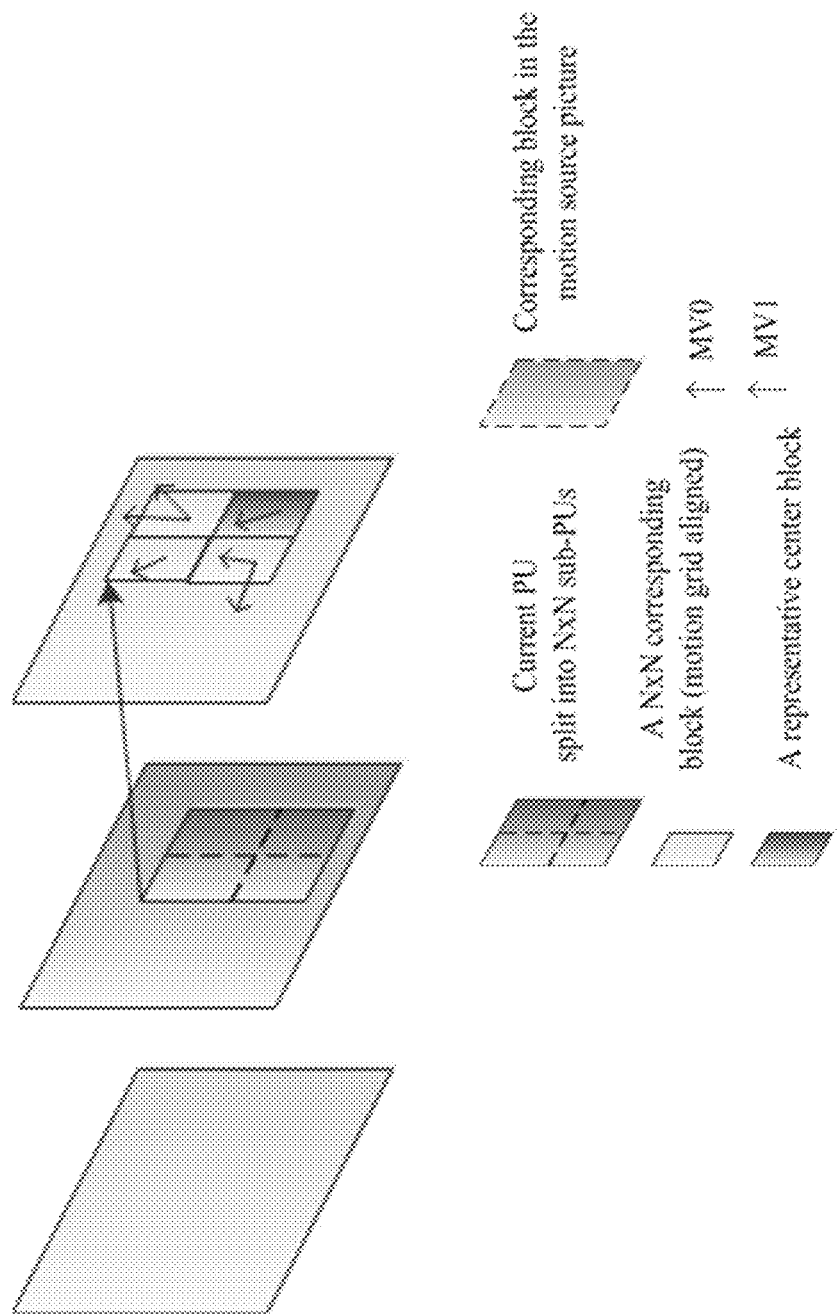
FIG. 9 shows an example of ATMVP motion prediction for a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 9, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 9.

FIG. 9 shows an example of ATMVP motion prediction for a CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.8 HMVP

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 10.

Figure 10:
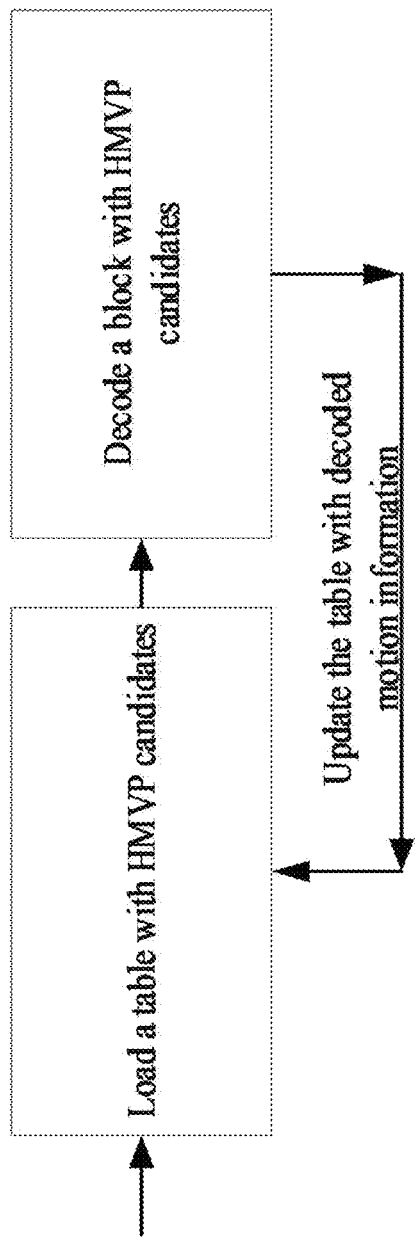
FIG. 10 is an example of decoding with the proposed HMVP method.

FIG. 10 shows an example of a decoding flow chart with the proposed HMVP method.

Figure 11:
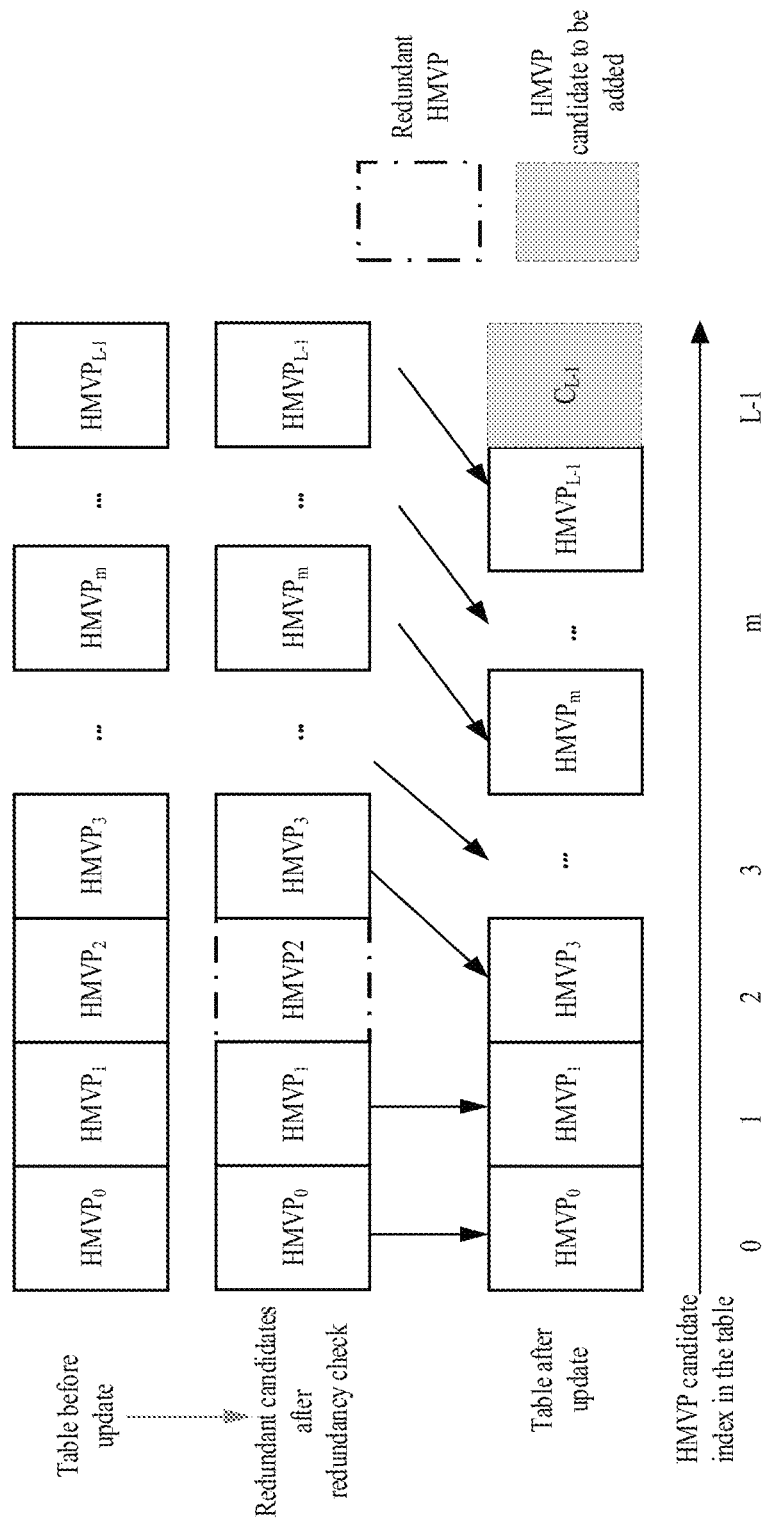
FIG. 11 is an example of updating the table in the proposed HMVP method.

FIG. 11 shows an example of updating the table in the proposed HMVP method.

In this contribution, the table size S is set to be 6, which indicates up to 6 HMVP candidates may be added to the table. When inserting a new motion candidate to the table, a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP).

To reduce the number of pruning operations, three simplifications are introduced:
1) Number of HMPV candidates to be check denoted by L is set as follows:

$$L=(N<=4)?M:(8-N)$$

wherein N indicates number of available non-sub block merge candidate and M indicates number of available HMVP candidates in the table.
2) In addition, once the total number of available merge candidates reaches the signaled maximally allowed merge candidates minus 1, the merge candidate list construction process from HMVP list is terminated.
3) Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In this contribution, K is set to 4 while the AMVP list size is kept unchanged, i.e., equal to 2.

2.9 Dual Coding Tree

In the current VVC design, luma and chroma components can have different coding trees. There can be two coding trees for a CTU. One is for luma component, where the coding tree defines how to split a CTU into coding units for luma component. The other is for chroma components, where the coding tree defines how to split a CTU into coding units for chroma components.

When dual coding tree is used, a coding unit can may contain only luma component or only chroma components. Because luma and chroma components have different coding trees, coding units of luma and chroma components may not be aligned so that a luma coding unit can correspond to several chroma coding units; and a chroma coding unit can also correspond to several luma coding units.

2.10 Transquant Bypass Design in HEVC

In the HEVC design, it is allowed to bypass transform, quantization and in-loop filtering for a coding unit, to provide a mechanism for lossless coding. When this feature is enabled, a flag named cu transquant bypass flag is sent for each coding unit. When cu transquant bypass flag is true for a coding unit, the corresponding transform, quantization and in-loop filtering, including deblocking and sample adaptive offset, will not be performed.

In addition to the CU level flag, a SPS level flag is firstly signalled (transquant bypass enabled flag) to indicate whether this method is enabled or disabled.

3. Examples of Technical Problems Solved by Disclosed Embodiments

1. In the current design of VVC test mode, a reference block for CPR should be fully within a certain area, e.g. reconstructed area of the current CTU. Such a restriction significantly reduces the number of potential reference blocks, and thus may cause coding efficiency loss. Existing methods of padding are either less flexible, e.g. padding with the mid-grey level, or significantly increase the complexity of the decoder, e.g. padding based on the statistics of neighboring pixels. Effective padding methods are needed.
2. In the current design of HEVC-SCC and VVC test mode, CPR is treated as an Inter mode with reference picture being the current picture. However, because CPR and Inter may have much different characteristics, mixing them together limits the efficiency of each one. Thus, to favor coding efficiency, it is desired to separate CPR from Inter mode.
3. When dual tree is applied, luma and chroma blocks may select different partition structures. How to handle the transquant bypass mode is unclear.
4. When dual tree is applied, the current VVC design requires that all luma CUs within the collocated luma region are coded with CPR and each 2×2 block' BV derived from each 4×4 luma block is valid. Such strong restrictions of the usage of CPR mode limits the coding gain of CPR.

4. Example Embodiments and Techniques

The detailed techniques below should be considered as examples to explain general concepts. These techniques should not be interpreted in a narrow way. Furthermore, these techniques can be combined in any manner.

Padding for Current Picture Referencing
1. Padding with a value signalled to the decoder. The value can represent the background. Thus, padding with the value will most likely hit the background.
   a. In one example, the value can be signalled at sequence level, e.g. SPS. It indicates that that value is common in that sequence.
   b. In one example, the value can be signalled at slice/tile group/tile level, e.g. tile group header. It indicates that that value is common in that tile or slice.
   c. In one example, the value can be signalled at CTU level, e.g. CTU syntax. It indicates that that value is common in that area.
   d. In one example, the value may be signalled in VPS/PPS/picture header/CTU rows/region covering multiple CTUs or multiple CUs.
   e. Prediction of signalling of values may be applied if the value could be signalled at different levels, e.g., SPS and PPS. In this way, the differences between two values may be signalled.
   f. The value may be quantized before signalling. After parsing, the value may be dequantized at decoder.
   g. The value (may be quantized) may be binarized with
      a. Unary code;
      b. Truncated unary code;
      c. Fixed length code;
      d. Exponential Golomb Code (such as EG-0 or EG-1)
2. Padding with a value that can be adaptively updated.
   a. In one example, for each CPR CU, a flag is sent to indicate whether padding with a new value or padding with the default one is used. When the flag is true, a value will be sent thereafter. When the flag is false, padding with the default value will be used if padding is needed.
3. Instead of coding one value in above examples, a set of values may be signalled. For each CTU/slice/tile/picture, an index of a value in the set may be signalled.

4. Padding with a value in a list
   a. In one example, a padding value list is maintained. When a new value is used, it will be inserted into the head of the list.
   b. Alternatively, the new value can be inserted into the tail of the list.
   c. In one example, when a value is inserted into the list, if there is already a same value in the list, do nothing.
   d. Alternatively, when a value is inserted into the list, if there is already a same value in the list, do not insert a new element but put the value to the head of the list.
   e. Alternatively, when a value is inserted into the list, if there is already a same value in the list, do not insert a new element but put the value to the tail of the list.
   f. In one example, the list can be initialized with predefined values, e.g. 0, mid-grey, the maximum value level, or their combinations.
   g. In one example, the list can be initialized with values sent at SPS/PPS/Slice/Tile group level.
   h. In one example, a flag is sent to indicate whether padding with a value in the padding value list is used.
   i. In one example, when a value in the padding value list is used, an index is sent to indicate which value in the list will be used.
5. The above padding methods can also be applied to normal Inter coding mode when padding is needed.
   a. In one example, different padding value may be used for different coding modes.
6. The padding value disclosed above may be for different colour components.
   a. In one example, different padding values are used for different colour components.
   b. In one example, different padding values are signaled for different colour components.
7. In one example, different padding values may be used for different regions.

Separate Design of Current Picture Referencing from Inter Mode

8. It is proposed that a separate merge list should be used and maintained for CPR coding mode.
9. It is proposed that a separate AMVP list should be used and maintained for CPR coding mode.
10. It is proposed that a separate HMVP list should be used and maintained for CPR coding mode.
11. It is proposed that a separate affine merge list should be used and maintained for CPR coding mode.
12. It is proposed that zero motion vector, i.e. (0, 0) used as the default stuffing candidates should be interpreted as or replaced by another vector for CPR coding mode, because (0, 0) is not a valid BV for CPR.
    a. In one example, (0, 0) is interpreted as or replaced by (−W, 0), where W is the width of the current CU.
    b. In one example, (0, 0) is interpreted as or replaced by (−2 W, 0), where W is the width of the current CU.
    c. In one example, (0, 0) is interpreted as or replaced by (0, −H), where H is the height of the current CU.
    d. In one example, (0, 0) is interpreted as or replaced by (0, −2H), where H is the height of the current CU.
    e. In one example, (0, 0) is interpreted as or replaced by (−M, −N), where M and N are predefined constant values. In one example, (0, 0) is interpreted as (−M, −N), where M and N depend on the block's position within a CTU.
    f. The unit of the MVs disclosed above are integer pixel.
13. It is proposed that an invalid motion vector (Bx, By) when considered as a BV, i.e. used for CPR coding mode, should be interpreted as or replaced by another vector to make it valid possibly.
    a. In one example, (Bx, By) is interpreted as or replaced by (Bx-M, By-N), where M and N are predefined constant values.
    b. In one example, when (Bx-M, By-N) is still invalid, procedure described above can repeat, i.e. (Bx, By) is further interpreted as or replaced by (Bx-M-M, By-N-N).
    c. In one example, the above procedure can repeat until the modified motion vector becomes valid as a block vector.
    d. In one example, (Bx, By) is interpreted to point to the upper-left pixel of the valid reference area of CPR.
    e. In one example, (Bx, By) is interpreted to point to the upper-left pixel of the current CTU.

Transquant Bypass Design

14. It is proposed that when transquant bypass coding is used for a coding unit, ALF should be bypassed.
15. How to signal/interpret/use transquant_bypass flags may depend on color components.
    a. In one example, how to signal/interpret/use transquant_bypass flags may depend on whether separate partition tree structure for different color components is used.
    b. In one example, when separate partition tree structure for luma and chroma components is applied, a first flag for a luma block may be signalled and a second flag for a chroma block may be signalled independently.
    c. In one example, when separate partition tree structure for the three color components is applied, three flags may be signalled independently.
    d. In one example, depending on color component, the transquant bypass enabling/disabling flag is interpreted as different variables, e.g. transquant bypass luma and transquant bypass chroma, to control following video coding process.
    e. In the filtering process (such as deblocking filter, sample adaptive loop filter, adaptive loop filter), whether one block of a color component should be filtered may depend on the transquant_bypass flag associated with the color component.
    f. Alternatively, even separate partition tree structure is enabled, transquant_bypass flags are only signalled for the luma component, while for a chroma block, it may inherit the transquant_bypass flag from any location within one corresponding luma block (e.g., from the center position of the corresponding luma block).
    g. Alternatively, furthermore, the restriction of allowed transquant_bypass coded block size/dimension may be signalled for different color components or for luma and chroma separately.
16. An indication to tell whether transform/quantization bypass mode is enabled at PPS/VPS/picture header/slice header/tile group header/CTUs may be signalled.
    a. In one example, if separate tree partition structure (e.g., dual tree) is applied, the indications may be signaled more than once for one picture/slice/tile group/CTU.
    b. In one example, if separate tree partition structure (e.g., dual tree) is applied, the indications may be signaled separately for different color components.

Figure 12:
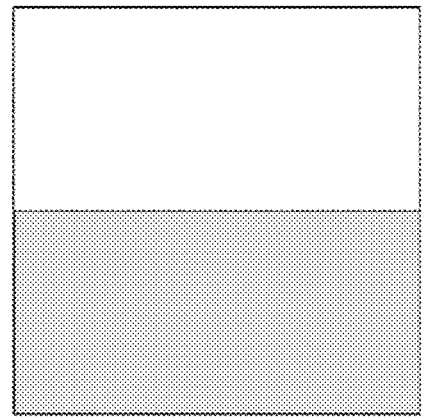
FIG. 12 is an example of one coding tree unit (CTU) with a dual tree.
Figure 12:
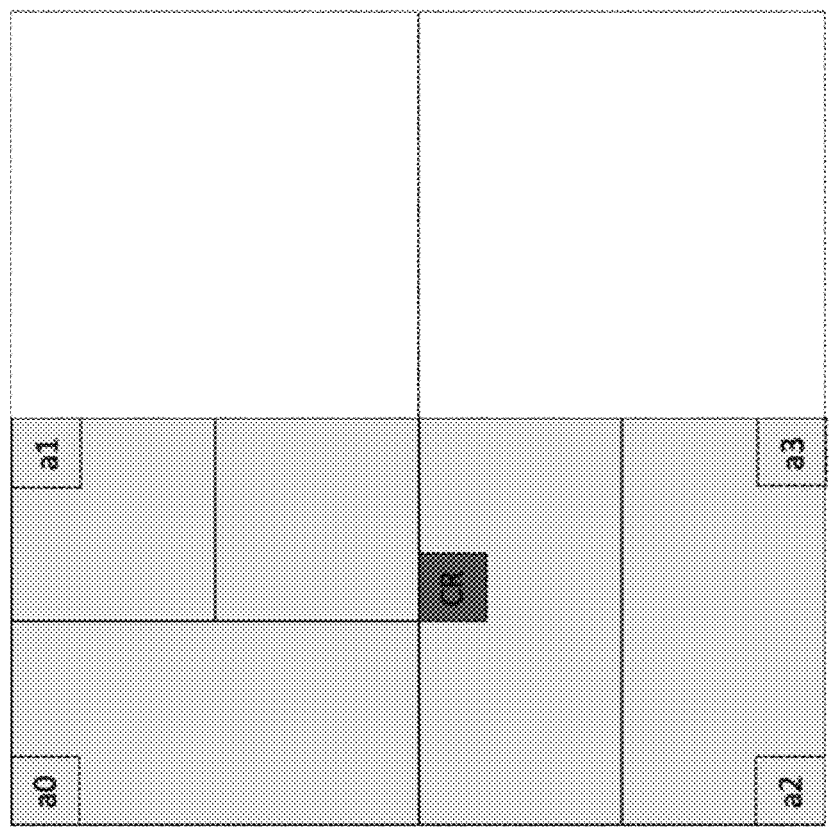

CPR under dual tree
17. A confirming bitstream shall follow the rule that if one chroma block is coded with CPR mode, the chroma block's BV derived from one selected luma block shall be valid.
18. A confirming bitstream shall follow the rule that if one chroma block is coded with CPR mode, the reference sample of the top-left and bottom-right sample of the chroma block identified by its BV shall be valid.
19. More than one luma blocks in the collocated luma region of one chroma block may be checked in order to derive the chroma block's BV.
    a. In one example, multiple blocks may be checked in order to select one of them to derive the chroma block's BV.
    b. In one example, multiple blocks may be checked in order to select more than 1 block to derive the chroma block's BV.
    c. The checking order/locations of luma blocks may be pre-defined or signalled. Alternatively, furthermore, it may depend on the block's dimension (e.g., block size; block shape; etc. al).
    d. The checking process may be terminated once a block is coded with the CPR mode.
    e. The checking process may be terminated once a block is coded with the CPR mode and the corresponding BV is valid for the Chroma block.
    f. In one example, one block covering the center position of the collocated luma region (e.g., CR in FIG. 12) is firstly checked whether it is coded with the CPR mode, followed by luma blocks covering corner samples (e.g., a0, and a3; or a0, a1, a2, a3). The checking process may be terminated once a block is coded with the CPR mode and the derived chroma block's BV derived from that block is a valid BV. A confirming bitstream shall follow the rule that if one chroma block is coded with CPR mode, the chroma block's BV derived from one selected luma block or multiple selected luma blocks shall be valid.
    g. In one example, one block covering the center position of the collocated luma region (e.g., CR in FIG. 12) is firstly checked whether it is coded with the CPR mode, followed by luma blocks covering corner samples (e.g., a0, and a3; or a0, a1, a2, a3). The checking process may be terminated once a block is coded with the CPR mode. A confirming bitstream shall follow the rule that if one chroma block is coded with CPR mode, the chroma block's BV derived from one selected luma block or multiple selected luma blocks shall be valid.
    h. Alternatively, one block covering the center position of the collocated luma region (e.g., CR in FIG. 12) is firstly checked whether it is coded with the CPR mode and return a valid BV, followed by luma blocks covering corner samples (e.g., a0, and a3; or a0, a1, a2, a3). The checking process may be terminated once a block is coded with the CPR mode and the derived chroma block's BV derived from that block is a valid BV. A confirming bitstream shall follow the rule that if one chroma block is coded with CPR mode, the chroma block's BV derived from one selected luma block or multiple selected luma blocks shall be valid.
20. When a checking process cannot return a valid BV from Luma blocks (e.g., methods mentioned in bullet 19), additional default BVs will be checked to derive the chroma block's BV.
    a. In one example, a default BV for Chroma block is (−w, 0) where w is the width of the Chroma block.
    b. In one example, a default BV for Chroma block is (−2w, 0) where w is the width of the Chroma block.
    c. In one example, a default BV for Chroma block is (0, −h) where h is the height of the Chroma block.
    d. In one example, a default BV for Chroma block is (0, −2h) where h is the height of the Chroma block.
    e. In one example, a default BV list is {(−w, 0), (0, −h)}. The BV in the list will be checked in order to get one valid BV.
    f. In one example, a default BV list is {(−2w, 0), (0, −2h), (−w, 0), (0, −h)}. The BV in the list will be checked in order to get one valid BV.
21. It is proposed to set valid BVs for all chroma sub-blocks regardless whether the BV derived from corresponding luma block is valid or not.
    a. In one example, when one sub-block's corresponding luma block couldn't return a valid BV, other BVs (e.g., default BV) may be used instead.
    b. In one example, the found BV with above methods in bullet 19 may be used a default BV for sub-blocks.
    c. Alternatively, bullets 19 and 20 may be utilized together to find a default BV.
22. For above examples, when a BV is valid, the following conditions shall be true:
    a. All samples within the reference block identified by a BV shall be within the restricted search range (e.g., shall be within the same CTU in current VVC design).
    b. All samples within the reference block identified by a BV have been reconstructed.
23. When a checking process cannot return a BV from Luma blocks (e.g., methods mentioned in bullet 19), additional default BVs will be checked to derive the chroma block's BV.
    a. In one example, when the Luma subblock CR position shown in FIG. 4-1 is not coded in CPR, additional default BVs will be checked to derive the chroma block's BV.
    b. In one example, when all Luma subblock in CR, a0, a1, a2, a3 positions shown in FIG. 4-1 are not coded in CPR, additional default BVs will be checked to derive the chroma block's BV.
    c. In one example, a default BV for Chroma block is (−w, 0) where w is the width of the Chroma block.
    d. In one example, a default BV for Chroma block is (−2w, 0) where w is the width of the Chroma block.
    e. In one example, a default BV for Chroma block is (0, −h) where h is the height of the Chroma block.
    f. In one example, a default BV for Chroma block is (0, −2h) where h is the height of the Chroma block.
    g. In one example, a default BV list is {(−w, 0), (0, −h)}. The BV in the list will be checked in order to get one valid BV.
    h. In one example, a default BV list is {(−2w, 0), (0, −2h), (−w, 0), (0, −h)}. The BV in the list will be checked in order to get one valid BV.

Figure 13:
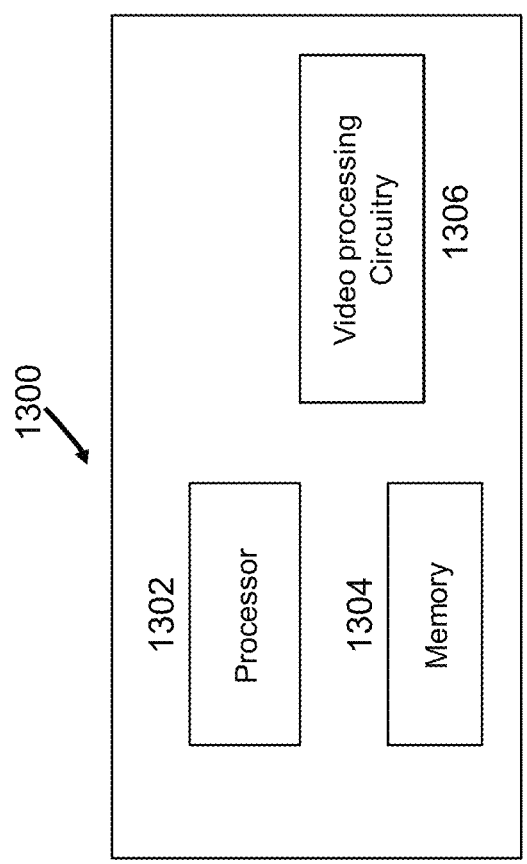
FIG. 13 is a block diagram of an example apparatus that may implement encoding or decoding techniques described herein.

FIG. 13 is a block diagram of a video processing apparatus 1300. The apparatus 1300 may be used to implement one or more of the methods described herein. The apparatus 1300 may be embodied in a smartphone, tablet, computer, Internet of Things (IoT) receiver, and so on. The apparatus 1300 may include one or more processors 1302, one or more memories 1304 and video processing hardware 1306. The processor(s) 1302 may be configured to implement one or more methods described in the present document. The memory (memories) 1304 may be used for storing data and code used for implementing the methods and techniques described herein. The video processing hardware 1306 may be used to implement, in hardware circuitry, some techniques described in the present document.

Figure 14:
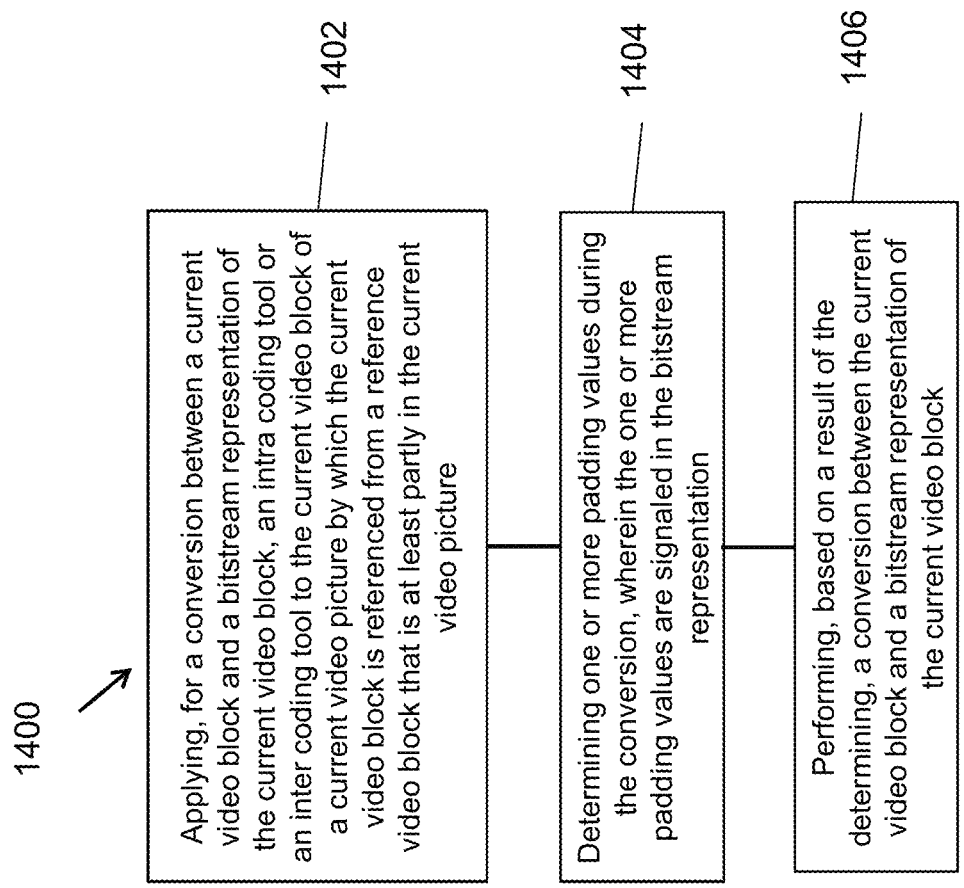
FIG. 14 is a flowchart for an example method of video processing.

FIG. 14 is a flowchart for an example method 1400 of video processing. The method 1400 includes applying (1402), for a conversion between a current video block and a bitstream representation of the current video block, an intra coding tool or an inter coding tool to the current video block of a current video picture by which the current video block is referenced from a reference video block that is at least partly in the current video picture, determining (1404) one or more padding values during the conversion, wherein the one or more padding values are signaled in the bitstream representation and performing (1406) the conversion using the one or more padding values and the intra coding tool or the inter coding tool.

Figure 15:
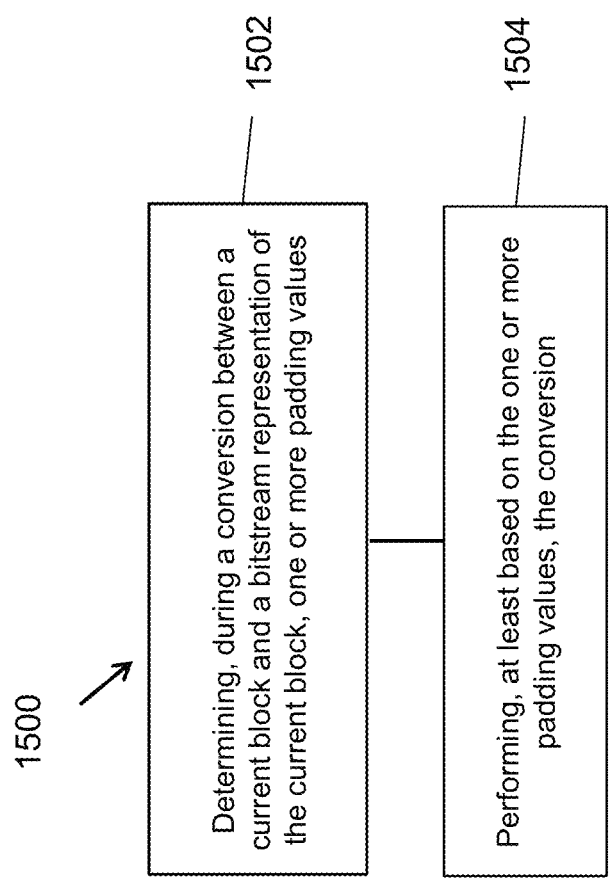
FIG. 15 is a flowchart for an example method of video processing.

FIG. 15 is a flowchart for an example method 1500 of video processing. The method 1500 includes determining (1502), during a conversion between a current block and a bitstream representation of the current block, one or more padding values; and performing (1504), at least based on the one or more padding values, the conversion.

Figure 16:
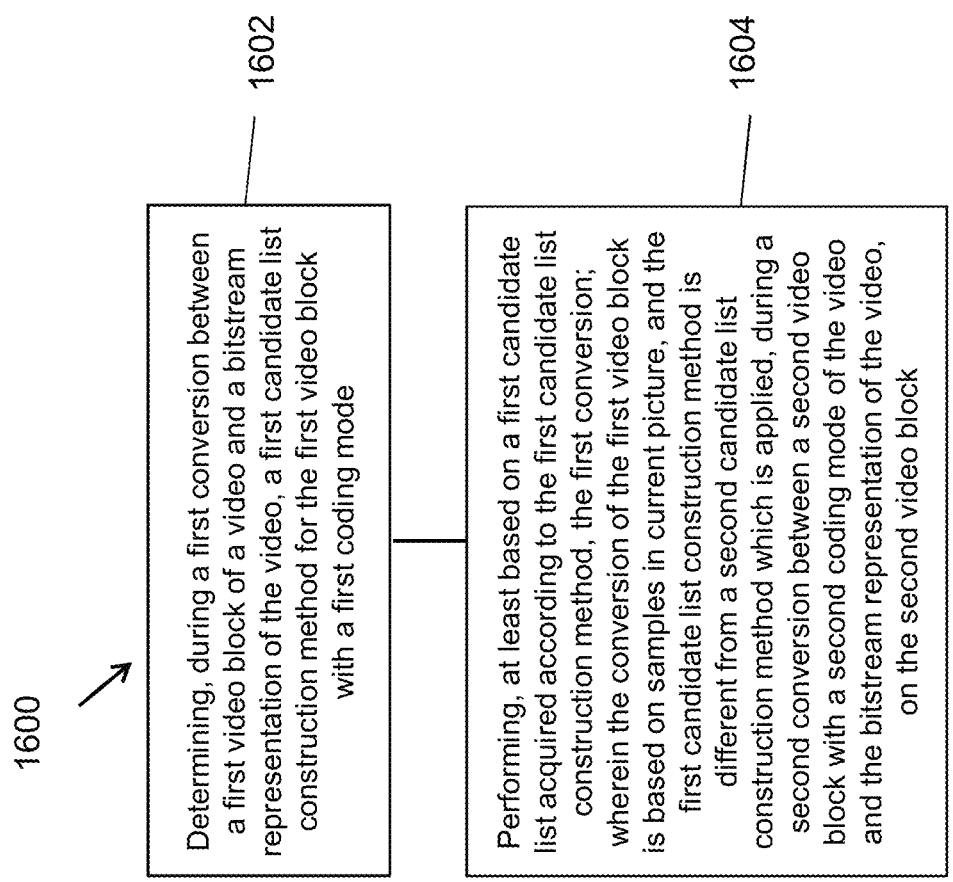
FIG. 16 is a flowchart for an example method of video processing.

FIG. 16 is a flowchart for an example method 1600 of video processing. The method 1600 includes determining (1602), during a first conversion between a first video block of a video and a bitstream representation of the video, a first candidate list construction method for the first video block with a first coding mode; and performing (1604), at least based on a first candidate list acquired according to the first candidate list construction method, the first conversion; wherein the conversion of the first video block is based on samples in current picture, and the first candidate list construction method is different from a second candidate list construction method which is applied, during a second conversion between a second video block with a second coding mode of the video and the bitstream representation of the video, on the second video block.

Figure 17:
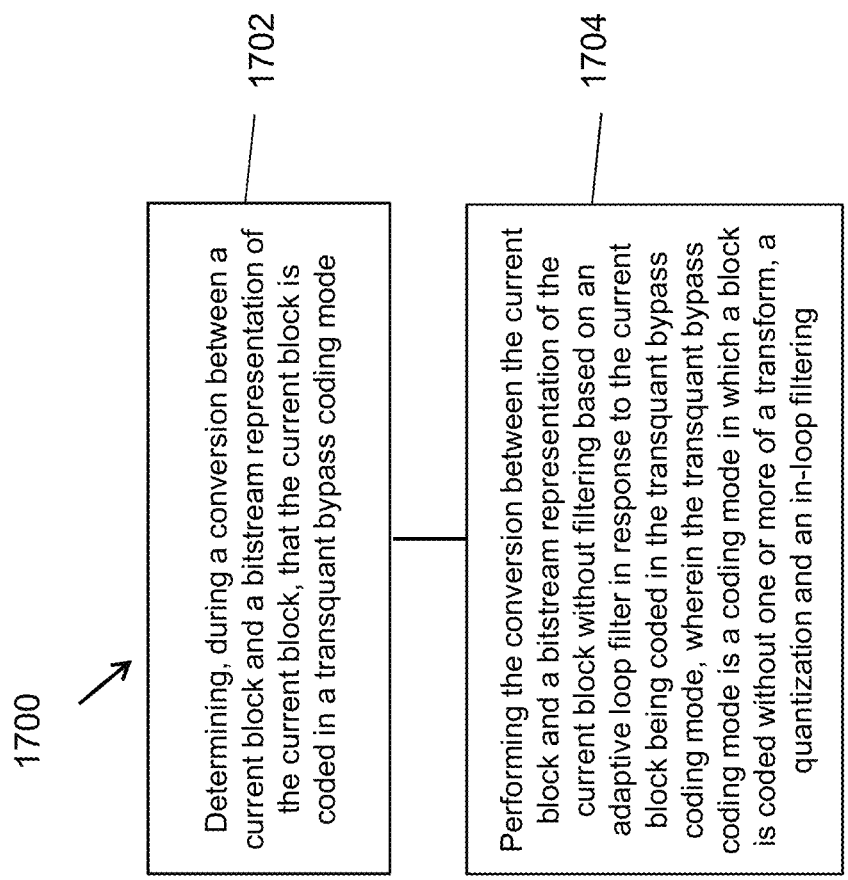
FIG. 17 is a flowchart for an example method of video processing.

FIG. 17 is a flowchart for an example method 1700 of video processing. The method 1700 includes determining (1702), during a conversion between a current block and a bitstream representation of the current block, that the current block is coded in a transquant bypass coding mode; and performing (1704) the conversion between the current block and a bitstream representation of the current block without filtering based on an adaptive loop filter in response to the current block being coded in the transquant bypass coding mode, wherein the transquant bypass coding mode is a coding mode in which a block is coded without one or more of a transform, a quantization and an in-loop filtering.

Figure 18:
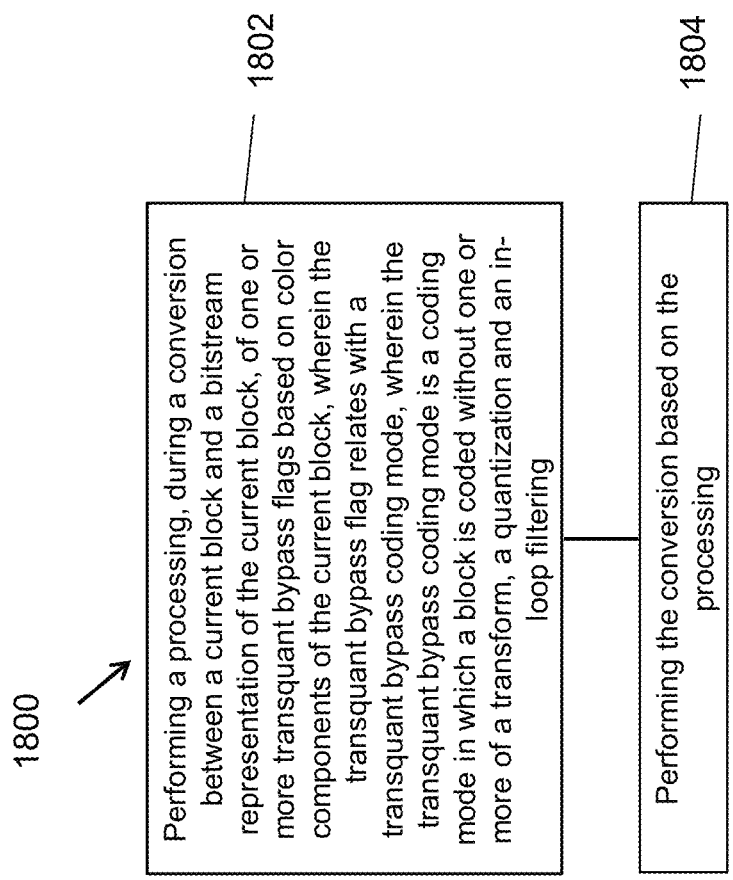
FIG. 18 is a flowchart for an example method of video processing.

FIG. 18 is a flowchart for an example method 1800 of video processing. The method 1800 includes performing (1802) a processing, during a conversion between a current block and a bitstream representation of the current block, of one or more transquant bypass flags based on color components of the current block, wherein the transquant bypass flag relates with a transquant bypass coding mode, wherein the transquant bypass coding mode is a coding mode in which a block is coded without one or more of a transform, a quantization and an in-loop filtering; and performing (1804) the conversion based on the processing.

Figure 19:
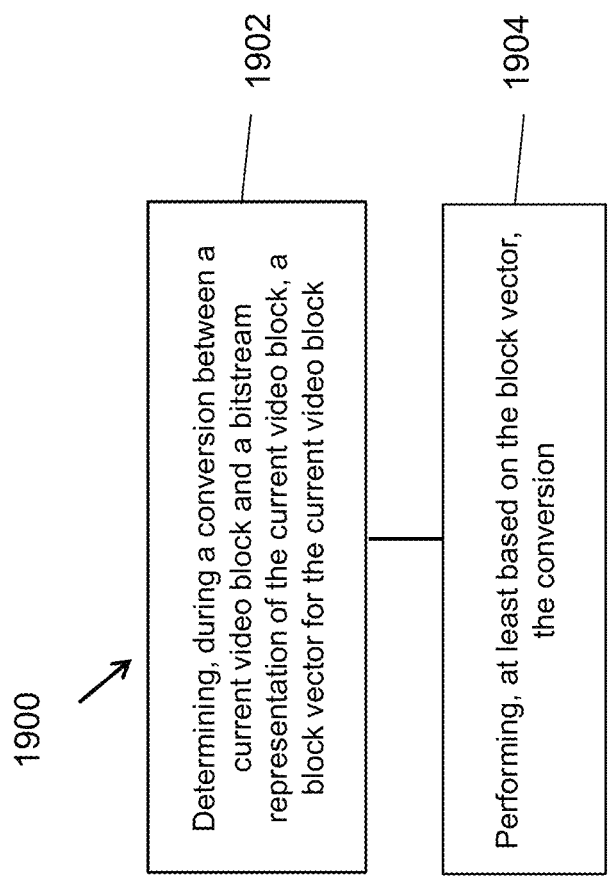
FIG. 19 is a flowchart for an example method of video processing.

FIG. 19 is a flowchart for an example method 1900 of video processing. The method 1800 includes determining (1902) during a conversion between a current video block and a bitstream representation of the current video block, a block vector for the current video block; and performing (1904) at least based on the block vector, the conversion, wherein when the current video block is coded with a coding mode using a reference block for prediction pointing to a same picture that the current video block is located in, and the current video block is a first type of block, the block vector is derived from at least one second type of block.

Figure 20:
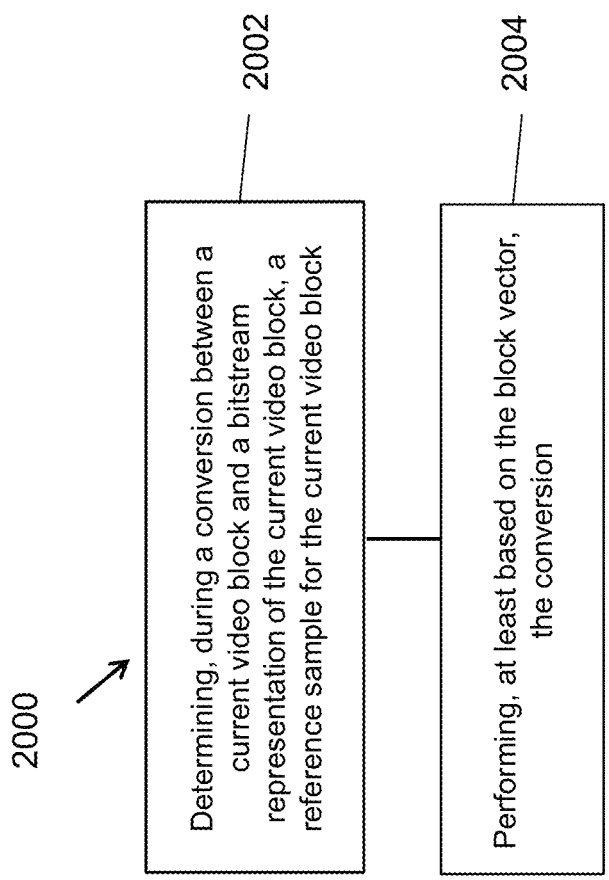
FIG. 20 is a flowchart for an example method of video processing.

FIG. 20 is a flowchart for an example method 2000 of video processing. The method 2000 includes determining (2002) during a conversion between a current video block and a bitstream representation of the current video block, a reference sample for the current video block; and performing (1904) at least based on the block vector, the conversion, wherein when the current video block is coded with a coding mode using a reference block for prediction pointing to a same picture that the current video block is located in, and the reference sample comprises the top-left and bottom-right sample of the current video block identified by a block vector of current video block.

It will be appreciated that several techniques have been disclosed that will benefit video encoder and decoder embodiments incorporated within video processing devices such as smartphones, laptops, desktops, and similar devices by allowing the use of intra-picture video coding such as CPR. Some techniques and embodiments may be described in a clause-based format as below.

1. A method of video processing, comprising: applying, for a conversion between a current video block and a bitstream representation of the current video block, an intra coding tool or an inter coding tool to the current video block of a current video picture by which the current video block is referenced from a reference video block that is at least partly in the current video picture; determining one or more padding values during the conversion, wherein the one or more padding values are signaled in the bitstream representation; and performing the conversion using the one or more padding values and the intra coding tool or the inter coding tool.

2. The method of clause 1, wherein the bitstream representation includes the one or more padding values at a sequence parameter set level or a slice level or a tile group level or a tile level or a coding tree unit level or a video parameter set level or a picture parameter set level or a picture header level or a coding tree unit row level or at a region level, where the region covers multiple coding units.

3. The method of any of clauses 1-2, wherein the one or more padding values are included in the bitstream representation in a quantized format.

4. The method of any of clauses 1-3, wherein the one or more padding values are included in the bitstream representation using a binarization scheme that is (a) a unary code or (b) a truncated unary code or (c) a fixed length code or (d) an exponential Golomb code.

5. The method of any of clauses 1-4, wherein the one or more padding values are adaptively dependent on a video characteristic.

6. The method of clause 5, wherein the adaptive dependency indicated in the bitstream representation at a sequence parameter set level or a slice level or a tile group level or a tile level or a coding tree unit level or a video parameter set level or a picture parameter set level or a picture header level or a coding tree unit row level or at a region level, where the region covers multiple coding units.

7. The method of any of clauses 1-6, wherein the bitstream representation includes an identification of the one or more padding values included within a list of padding values included in the bitstream representation.
8. The method of any of clauses 1-7, wherein the one or more padding values include padding values that are different for at least some of color or luma components.
9. The method of any of clauses 1-8, wherein the one or more padding values include padding values that are different for at least some of video picture regions.
10. A method of video processing, comprising:
   determining an intra candidate list for intra coding mode of a current video block during a conversion between the current video block and a bitstream representation of the current video block; and performing, using the intra candidate list, the conversion between the current video block and the bitstream representation, wherein the intra candidate list for intra coding mode is different from a candidate list for an inter-coding mode of the current video block; and wherein the candidate list is one of a merge list or a history based motion vector predictor list or an affine merge list.
11. The method of clause 10, wherein the intra candidate list uses one of the following motion vector as a default stuffing candidate:
   (a) (−W, 0), where W is a width of the current video block; or
   (b) (−2 W, 0), or
   (c) (0, −H), where H is a height of the current video block, or
   (d) (0, −2H), or
   (e) (−M, −N), where M and N are pre-defined numbers.
12. The method of clause 11, wherein W, H, M and N are integers.
13. The method any of clauses 10-12, wherein the using the intra candidate list includes: replacing or interpreting an invalid motion vector (Bx, By) in the intra candidate list as one of the following:
   (a) (Bx-M, By-N), where M and N are predefined integers, or
   (b) repeatedly subtracting M and N from Bx and By until a valid motion vector is obtained, or
   (c) repeatedly subtracting M and N from Bx and By until a valid block vector is obtained, or
   (d) interpreting (Bx, By) as pointing to an upper-left pixel of a valid reference area for the current video block, or
   (e) interpreting (Bx, By) as pointing to an upper-left pixel of a coding tree unit of the current video block.
14. A method of video processing, comprising: performing a determination that a coding mode for a current video block is a transquant bypass coding mode in which the current video block is encoded into a bitstream representation by omitting a transform step and a quantization step; and performing, based on the determination, a conversion between the current video block and the bitstream representation according to the transquant bypass coding mode, wherein the conversion is performed without filtering based on an adaptive loop filter.
15. The method of clause 14, wherein one or more flags in the bitstream representation corresponds to the transquant bypass coding mode.
16. The method of clause 15, wherein a number of the one or more flags corresponds to a number of luma or color components of the current video block encoded using separate partition structures in the bitstream representation.
17. The method of clause 15, wherein a first flag of the one or more flags is signaled for a luma component of the current video block and a second flag of the one or more flags is signaled for two color components of the current video block.
18. The method of any of clauses 14-17 wherein the bitstream representation further includes one or more transquant_bypass flags indicating applicability of pulse code modulation coding modes of luma and color components of the current video block.
19. The method of clause 16, wherein chroma components inherit corresponding transquant_bypass flags from a position of the luma component of the current video block.
20. The method of clause 19, wherein the current position corresponds to a center position of the luma component of the current video block.
21. The method of clause 16, wherein the one or more flags are included at a picture parameter set level or a video parameter set level or a picture header level or a slice header level or a tile group header level or a coding tree unit level.
22. A method of video processing, comprising:
   performing a determination that a current video block, which is a chroma block, is coded with a current picture referencing mode; and
   performing, based on the determination, a conversion between the current video block and a bitstream representation of the current video block,
   wherein the conversion uses at least one of the following rules:
   (1) a block vector of the chroma block derived from a selected luma block is valid, or
   (2) a reference sample of a top-left and a bottom-right sample of the chroma block that is identified by its block vector is valid.
23. A method of video processing, comprising:
   selecting at least one luma block from a plurality of luma blocks in a collocated luma region of a current video block, which is a chroma block; and
   deriving, based on the at least one luma block, a block vector of the chroma block; and
   performing, based on the block vector, a conversion between the current video block and a bitstream representation of the current video block.
24. The method of clause 23, wherein the at least one luma block comprises more than one luma block.
25. The method of clause 23, wherein an order in which the plurality of luma blocks is checked to select the at least one luma block is pre-defined, signaled or based on a size or shape of the current video block.
26. The method of clause 23, wherein the current video block is coded with a current picture referencing mode, and wherein the block vector is valid.
27. The method of any of clauses 22-26, wherein a reference block is identified by the block vector, and wherein all samples within the reference block are within a restricted search range.
28. The method of clause 27, wherein the restricted search range is a coding tree unit.
29. The method of any of clauses 22-26, wherein a reference block is identified by the block vector, and wherein all samples within the reference block are reconstructed.

30. The method of clause 23, wherein the block vector is used as a default block vector for sub-blocks of the chroma block.
31. A method of video processing, comprising:
    determining that a block vector of a current video block, which is a chroma block, cannot be derived based on a luma block in a collocated luma region of the current video block;
    selecting, based on the determining, a default block vector as the block vector of the chroma block; and
    performing, based on the block vector, a conversion between the current video block and a bitstream representation of the current video block.
32. The method of clause 31, wherein the default block vector is (w, 0), and wherein w is a width of the chroma block.
33. The method of clause 31, wherein the default block vector is (0, h), and wherein h is a height of the chroma block.
34. The method of clause 31, wherein the default block vector is (0, 2h), and wherein h is a height of the chroma block.
35. The method of clause 31, wherein the default block vector is selected from a default block vector list comprising (w, 0) and (0, h), and wherein w and h are a width and a height of the chroma block, respectively.
36. The method of clause 31, wherein the default block vector is selected from a default block vector list comprising (−2w, 0), (0, 2h), (w, 0) and (0, h), and wherein w and h are a width and a height of the chroma block, respectively.
37. The method of any of clauses 1 to 36, wherein the conversion includes generating pixel values of the current video block from the bitstream representation.
38. The method of any of clauses 1 to 36, wherein the conversion includes generating the bitstream representation from the current video block.
39. A video encoder apparatus comprising a processor configured to implement a method recited in any of clauses 1 to 38.
40. A video decoder apparatus comprising a processor configured to implement a method recited in any of clauses 1 to 38.
41. A computer-readable medium having code stored thereon, the code, when executed, causing a processor to implement a method recited in any of clauses 1 to 38.

Some techniques and embodiments may be described in another clause-based format as below.
1. A method of video processing, comprising:
    determining, during a conversion between a current block and a bitstream representation of the current block, one or more padding values; and
    performing, at least based on the one or more padding values, the conversion.
2. The method of clause 1, wherein the one or more padding values are signaled in the bitstream representation at one or more levels, and the one or more padding values are the same for one level in the one or more levels.
3. The method of clause 2, wherein the one or more levels comprise one or more of:
    a sequence parameter set level, a slice level, a tile group level, a tile level, a coding tree unit level, a video parameter set level, a picture parameter set level, a picture header level, a coding tree unit row level, and a region level corresponding to multiple coding tree units or multiple coding units.
4. The method of anyone of clauses 1-3, wherein the one or more padding values for a first level are predicted from the one or more padding values for a second level based on a signaled difference between the values of the two levels.
5. The method of anyone of clauses 1-4, wherein the one or more padding values are quantized.
6. The method of clause 5, wherein the one or more padding values are quantized using one or more of:
    a unary code, a truncated unary code, a fixed length code, and an exponential Golomb code.
7. The method of anyone of clauses 1-6, further comprises:
    adaptively updating the one or more padding values.
8. The method of clause 7, wherein adaptively updating the one or more padding values comprises:
    updating the one or more padding values according to a first flag,
    wherein the first flag indicates whether a default padding value or a newly sent padding value is used.
9. The method of anyone of clauses 1-8, wherein an index of the one or more padding values in a set is signaled for one or more of each coding tree unit, each slice, each tile and each picture.
10. The method of clause 9, wherein the set of one or more padding values are signaled.
11. The method of clauses 1-10, wherein the one or more padding values are from a padding value list.
12. The method of anyone of clauses 1-11, further comprises:
    maintaining a padding value list based on the one or more padding values.
13. The method of clause 12, wherein maintaining a padding value list based on the one or more padding values comprises:
    inserting a new padding value used for the conversion into the padding value list.
14. The method of clause 13, wherein inserting a new padding value used for the conversion into the padding value list comprises:
    inserting a new padding value into head or tail of the padding value list.
15. The method of clause 12, wherein maintaining a padding value list based on the one or more padding values comprises:
    keeping the padding value list unchanged when a padding value used for the conversion is in the padding value list before the conversion.
16. The method of clause 12, wherein maintaining a padding value list based on the one or more padding values comprises:
    putting a padding value used for the conversion into head or tail of the padding value list when the padding value used for the conversion is in the padding value list before the conversion.
17. The method of anyone of clauses 12-16, further comprising:
    initializing the padding value list with one or more predefined values.
18. The method of clause 17, wherein the one or more predefined values comprise one or more of 0, mid-grey, a maximum value level.
19. The method of clause 17, wherein the one or more predefined values are sent at one or more of the sequence parameter set level, the picture header level, the slice level and the tile group level.

20. The method of anyone of clauses 12-19, wherein a second flag is signaled to indicate that the one or more padding values belong to the padding value list.
21. The method of anyone of clauses 12-20, wherein an index is sent to indicate the one or more padding values in the padding value list used for the conversion.
22. The method of anyone of clauses 1-21, wherein the conversion is performed at least based on the one or more padding values in an intra block copy (IBC) mode, an inter coding mode, or an intra coding mode.
23. The method of clause 22, wherein the one or more padding values used in different modes are different.
24. The method of anyone of clauses 1-23, wherein the one or more padding values used for different color components are different.
25. The method of anyone of clauses 1-24, wherein the one or more padding values signaled for different color components are different.
26. The method of anyone of clauses 1-25, wherein the one or more padding values used for different regions are different.
27. A video processing apparatus comprising a processor configured to implement a method recited in anyone of clauses 1 to 26.
28. The apparatus of clause 27, wherein the apparatus is a video encoder.
29. The apparatus of clause 27, wherein the apparatus is a video decoder.
30. A computer readable recoding media on which a program comprising code is recorded, the program is for a processor to carry out a method recited in anyone of clauses 1 to 26.

Some techniques and embodiments may be described in another clause-based format as below.

1. A method of video processing, comprising:
    determining, during a first conversion between a first video block of a video and a bitstream representation of the video, a first candidate list construction method for the first video block with a first coding mode;
    performing, at least based on a first candidate list acquired according to the first candidate list construction method, the first conversion;
    wherein the conversion of the first video block is based on samples in current picture, and the first candidate list construction method is different from a second candidate list construction method which is applied, during a second conversion between a second video block with a second coding mode of the video and the bitstream representation of the video, on the second video block.
2. The method of clause 1, wherein a reference block used for prediction in the first coding mode is pointing to a same picture that the current block is located in.
3. The method of clause 1 or 2, wherein the first coding mode is a current picture referencing (CPR) mode or an intra block copy (IBC) mode.
4. The method of anyone of clauses 1-3, wherein the first candidate list comprise one or more of:
    an IBC merge candidate list, an IBC spatial block vector candidate list, an IBC history-based block vector candidate list.
5. The method of anyone of clauses 1-4, wherein a second candidate list acquired according to a second candidate list construction method comprise one or more of:
    an inter merge candidate list, an inter spatial merging candidate list, an inter pairwise average merging candidate list, an inter zero motion vector merging candidate list, an inter history-based motion vector candidate list.
6. The method of anyone of clauses 1-5, wherein the second coding mode comprises one or more of:
    a non-IBC mode, a merge non-IBC mode, an advanced motion vector prediction (AMVP) non-IBC mode, a history-based motion vector prediction (HMVP) mode, an affine mode.
7. The method of anyone of clauses 1-6, wherein one of the following motion vectors is used to replace a zero motion vector as a default stuffing candidate in the first candidate list:
    (a) (−W, 0), or
    (b) (−2 W, 0), or
    (c) (0, −H), or
    (d) (0, −2H), or
    (e) (−M, −N),
    wherein W is a width of the current block, H is a height of the current video block, and M and N are pre-defined numbers.
8. The method of clause 7, wherein M and N depend on the current block's position in a coding tree unit (CTU).
9. The method of anyone of clauses 1-8, wherein performing, at least based on the first candidate list, the conversion comprises:
    replacing an invalid motion vector in the first candidate list with a valid motion vector; and
    performing, at least based on the valid motion vector, the conversion.
10. The method of clause 9, wherein replacing an invalid motion vector in the first candidate list with a valid motion vector comprises:
    an updating step of replacing the invalid motion vector with an updated motion vector by subtracting M and N from two components of the invalid motion vector respectively.
11. The method of clause 10, wherein replacing an invalid motion vector in the first candidate list with a valid motion vector comprises:
    repeating the updating step until the updated motion vector is the valid motion vector.
12. The method of anyone of clauses 9-11, wherein replacing an invalid motion vector in the first candidate list with a valid motion vector comprises:
    interpreting the invalid motion vector as pointing to an upper-left pixel of a valid reference area of the current block.
13. The method of anyone of clauses 9-12, wherein replacing an invalid motion vector in the first candidate list with a valid motion vector comprises:
    interpreting the invalid motion vector as pointing to an upper-left pixel of a coding tree unit (CTU) of the current block.
14. A video processing apparatus comprising a processor configured to implement a method recited in anyone of clauses 1 to 13.
15. The apparatus of clause 14, wherein the apparatus is a video encoder.
16. The apparatus of clause 14, wherein the apparatus is a video decoder.
17. A computer readable recoding media on which a program comprising code is recorded, the program is for a processor to carry out a method recited in anyone of clauses 1 to 13.

Some techniques and embodiments may be described in another clause-based format as below.

1. A method of video processing, comprising:
   determining, during a conversion between a current block and a bitstream representation of the current block, that the current block is coded in a transquant bypass coding mode; and
   performing the conversion between the current block and a bitstream representation of the current block without filtering based on an adaptive loop filter in response to the current block being coded in the transquant bypass coding mode, wherein the transquant bypass coding mode is a coding mode in which a block is coded without one or more of a transform, a quantization and an in-loop filtering.
2. The method of clause 1, wherein one or more transquant bypass flags are signaled, interpreted or used based on color components.
3. A method of video processing, comprising:
   performing a processing, during a conversion between a current block and a bitstream representation of the current block, of one or more transquant bypass flags based on color components of the current block, wherein the transquant bypass flag relates with a transquant bypass coding mode, wherein the transquant bypass coding mode is a coding mode in which a block is coded without one or more of a transform, a quantization and an in-loop filtering;
   performing the conversion based on the processing.
4. The method of clause 3, wherein the processing of the one or more transquant bypass flags comprises at least one of:
   signaling the one or more transquant bypass flags;
   interpreting the one or more transquant bypass flags;
   using the one or more transquant bypass flags.
5. The method of anyone of clauses 2-4, wherein the processing of the one or more transquant bypass flags depends on whether different partition tree structures are used for the different color components of the current block.
6. The method of anyone of clauses 2-5, wherein the one or more transquant bypass flags correspond to the different color components of the current block respectively, and the one or more transquant bypass flags are signaled independently, when different partition tree structures are used for the different color components of the current block.
7. The method of anyone of clauses 5-6, wherein the different color components comprise luma and chroma components.
8. The method of anyone of clauses 2-7, wherein the one or more transquant bypass flags are interpreted as different variables based on the color components.
9. The method of anyone of clauses 2-8, wherein a transquant bypass flag corresponding to a color component indicates whether the current block of the color component is filtered during the conversion between the current block and the bitstream representation of the current block.
10. The method of anyone of clauses 2-9, wherein one transquant bypass flag corresponding to one color component is signaled, and other transquant bypass flags corresponding to other color components are inherited from a location within the current block of the one color component.
11. The method of clause 10, wherein the location within the current block is the center position.
12. The method of anyone of clauses 1-11, wherein whether the current block of a color component is coded in a transquant bypass coding mode depends on a restriction parameter signaled for the different color components respectively.
13. The method of clause 12, wherein the restriction parameter indicates a size or a dimension of the current block of the color component.
14. The method of anyone of clauses 2-13, wherein the one or more transquant bypass flags are signaled at one or more levels.
15. The method of clause 14, wherein the one or more levels comprise one or more of:
   a picture parameter set level, a video parameter set level, a picture header level, a slice header level, a tile group level and a coding tree unit level.
16. The method of clause 14 or 15, wherein the one or more transquant bypass flags are signaled more than once for a picture or a slice or a tile group or a coding tree unit when the different partition tree structures are used.
17. A video processing apparatus comprising a processor configured to implement a method recited in anyone of clauses 1 to 16.
18. The apparatus of clause 17, wherein the apparatus is a video encoder.
19. The apparatus of clause 17, wherein the apparatus is a video decoder.
20. A computer readable recoding media on which a program comprising code is recorded, the program is for a processor to carry out a method recited in anyone of clauses 1 to 19.

Some techniques and embodiments may be described in another clause-based format as below.

1. A method of video processing, comprising:
   determining, during a conversion between a current video block and a bitstream representation of the current video block, a block vector for the current video block; and
   performing, at least based on the block vector, the conversion,
   wherein when the current video block is coded with a coding mode using a reference block for prediction pointing to a same picture that the current video block is located in, and the current video block is a first type of block, the block vector is derived from at least one second type of block.
2. The method of clause 1, wherein the first type of block is one of a chroma block and a luma block, the second type of block is another one of the chroma block and the luma block, and the first type is different from the second type.
3. The method of clause 1 or 2, wherein the first type of block and the second type of block have different coding trees.
4. The method of anyone of clauses 1-3, wherein a plurality of second type of blocks in a collocated region of the current video block are checked to derive the block vector.
5. The method of clause 4, wherein the plurality of second type of blocks in a collocated region of the current video block are checked to select one second type of block to derive the block vector.
6. The method of clause 4, wherein the plurality of second type of blocks in a collocated region of the current video block are checked to select more than one second type of blocks to derive the block vector.

7. The method of anyone of clauses 4-6, wherein the plurality of second type of blocks in a collocated region of the current video block are checked in a pre-defined or signaled order.
8. The method of anyone of clauses 4-7, wherein the plurality of second type of blocks in a collocated region of the current video block are checked in an order based on a size or shape of the current video block.
9. The method of anyone of clauses 4-8, wherein the plurality of second type of blocks in a collocated region of the current video block are checked until one of the plurality of second type of blocks is a block coded with the coding mode.
10. The method of anyone of clauses 4-8, wherein the plurality of second type of blocks in a collocated region of the current video block are checked until one block of the plurality of second type of blocks is a block coded with the coding mode and a valid block vector is derived from the one block.
11. The method of anyone of clauses 4-8, wherein a center block covering a center position of the collocated region in the plurality of second type of blocks is checked firstly, and then corner blocks covering corner samples of the collocated region in the plurality of second type of blocks are checked until one block of the plurality of second type of blocks is a block coded with the coding mode.
12. The method of anyone of clauses 4-8, wherein a center block covering a center position of the collocated region in the plurality of second type of blocks is checked firstly, and then corner blocks covering corner samples of the collocated region in the plurality of second type of blocks are checked until one block of the plurality of second type of blocks is a block coded with the coding mode and a valid block vector is derived from the one block.
13. The method of anyone of clauses 1-12, wherein a reference block is identified by the block vector, and wherein all samples within the reference block are within a restricted search range.
14. The method of clause 13, wherein the restricted search range is a coding tree unit of the current video block.
15. The method of anyone of clauses 1-14, wherein a reference block is identified by the block vector, and wherein all samples within the reference block are reconstructed.
16. The method of anyone of clauses 4-15, wherein a default block vector is used as the block vector when the block vector cannot be derived from the plurality of second type of blocks in a collocated region of the current video block.
17. The method of anyone of clauses 4-15, wherein a default block vector is used as the block vector when a center block covering a center position of the collocated region in the plurality of second type of blocks is not code with the coding mode.
18. The method of anyone of clauses 4-15, wherein a default block vector is used as the block vector when a center block covering a center position of the collocated region and corner blocks covering corner samples of the collocated region in the plurality of second type of blocks are not code with the coding mode.
19. The method of anyone of clauses 16-18, wherein the default block vector is (w, 0), and wherein w is a width of the current video block.
20. The method of anyone of clauses 16-18, wherein the default block vector is (−2w, 0), and wherein w is a width of the current video block.
21. The method of anyone of clauses 16-18, wherein the default block vector is (0, −h), and wherein h is a height of the current video block.
22. The method of anyone of clauses 16-18, wherein the default block vector is (0, −2h), and wherein h is a height of the current video block.
23. The method of anyone of clauses 16-18, wherein the default block vector is selected from a default block vector list comprising (w, 0) and (0, h), and wherein w and h are a width and a height of the current video block respectively.
24. The method of anyone of clauses 16-18, wherein the default block vector is selected from a default block vector list comprising (−2w, 0), (0, 2h), (w, 0) and (0, h), and wherein w and h are a width and a height of the current video block respectively.
25. The method of anyone of clauses 4-24, wherein a default sub-block vector is used as the block vector for sub-blocks of the current video block regardless whether the block vector can be derived from the plurality of second type of blocks in a collocated region of the current video block.
26. The method of anyone of clauses 4-24, wherein a default sub-block vector is used as the block vector for sub-blocks of the current video block when the block vector cannot be derived from sub-blocks of the plurality of second type of blocks in a collocated region of the current video block.
27. The method of clause 26, wherein the block vector derived from sub-blocks of the plurality of second type of blocks in a collocated region of the current video block is used as the default sub-block vector.
28. The method of clause 26, wherein the block vector derived from sub-blocks of the plurality of second type of blocks in a collocated region of the current video block or the default block vector selected from a default block vector list comprising (−2w, 0), (0, 2h), (w, 0) and (0, h) is used as the default sub-block vector, and wherein w and h are a width and a height of the current video block respectively.
29. The method of any one of clauses 1-24, wherein the block vector for the current video block is one vector block.
30. A method of video processing, comprising:
    determining, during a conversion between a current video block and a bitstream representation of the current video block, a reference sample for the current video block; and
    performing, at least based on the block vector, the conversion,
    wherein when the current video block is coded with a coding mode using a reference block for prediction pointing to a same picture that the current video block is located in, and the reference sample comprises the top-left and bottom-right sample of the current video block identified by a block vector of current video block.
31. A video processing apparatus comprising a processor configured to implement a method recited in anyone of clauses 1 to 30.
32. The apparatus of clause 31, wherein the apparatus is a video encoder.
33. The apparatus of clause 31, wherein the apparatus is a video decoder.

34. A computer readable recoding media on which a program comprising code is recorded, the program is for a processor to carry out a method recited in anyone of clauses 1 to 30.

It will be appreciated that several methods and apparatus for performing video processing that includes video encoding, e.g., generating a bitstream from pixel values of a video, or video decoding, e.g., generating video pixels from a bitstream are disclosed. The disclosed techniques may be incorporated into embodiments in which CPR is used for video coding. A bitstream representation of a video block may comprise bits that are contiguous or are non-contiguous (e.g., header fields and network abstraction layer or NAL fields).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:
1. A method of video processing, comprising:
determining, during a conversion between a current video block of a video and a bitstream of the video, a block vector for the current video block; and
performing, at least based on the block vector, the conversion,
wherein when the current video block is coded with a coding mode using a reference block for prediction pointing to a same picture that the current video block is located in, and the current video block is a first type of block, the block vector is derived from at least one second type of block, and
wherein a plurality of second type of blocks in a collocated region of the current video block are checked in an order based on a size or shape of the current video block to derive the block vector.

2. The method of claim 1, wherein the plurality of second type of blocks in a collocated region of the current video block are checked until one of the plurality of second type of blocks is a block coded with the coding mode.

3. The method of claim 1, wherein the plurality of second type of blocks in a collocated region of the current video block are checked until one block of the plurality of second type of blocks is a block coded with the coding mode and a valid block vector is derived from the one block.

4. The method of claim 1, wherein a center block covering a center position of the collocated region in the plurality of second type of blocks is checked firstly, and then corner blocks covering corner samples of the collocated region in the plurality of second type of blocks are checked until one block of the plurality of second type of blocks is a block coded with the coding mode.

5. The method of claim 1, wherein a center block covering a center position of the collocated region in the plurality of second type of blocks is checked firstly, and then corner blocks covering corner samples of the collocated region in the plurality of second type of blocks are checked until one block of the plurality of second type of blocks is a block coded with the coding mode and a valid block vector is derived from the one block.

6. The method of claim 1, wherein a default block vector is used as the block vector when a center block covering a center position of the collocated region in the plurality of second type of blocks is not code with the coding mode; or wherein a default block vector is used as the block vector when a center block covering a center position of the collocated region and corner blocks covering corner samples of the collocated region in the plurality of second type of blocks are not code with the coding mode.

7. The method of claim 6, wherein the default block vector is (−w, 0), and wherein w is a width of the current video block.

8. The method of claim 6, wherein the default block vector is (−2w, 0), and wherein w is a width of the current video block.

9. The method of claim 6, wherein the default block vector is (0, −h), and wherein h is a height of the current video block.

10. The method of claim 6, wherein the default block vector is (0, −2h), and wherein h is a height of the current video block.

11. The method of claim 6, wherein the default block vector is selected from a default block vector list comprising (−w, 0) and (0, −h); or selected from a default block vector list comprising (−2w, 0), (0, −2h), (−w, 0) and (0, −h), and wherein w and h are a width and a height of the current video block respectively.

12. The method of claim 1, wherein a default sub-block vector is used as the block vector for sub-blocks of the current video block regardless whether the block vector can be derived from the plurality of second type of blocks in a collocated region of the current video block.

13. The method of claim 1, wherein a default sub-block vector is used as the block vector for sub-blocks of the current video block when the block vector cannot be derived from sub-blocks of the plurality of second type of blocks in a collocated region of the current video block.

14. The method of claim 13, wherein the block vector derived from sub-blocks of the plurality of second type of blocks in a collocated region of the current video block is used as the default sub-block vector.

15. The method of claim 13, wherein the block vector derived from sub-blocks of the plurality of second type of blocks in a collocated region of the current video block or the default block vector selected from a default block vector list comprising (−2w, 0), (0, −2h), (−w, 0) and (0, −h) is used as the default sub-block vector, and wherein w and h are a width and a height of the current video block respectively.

16. The method of claim 1, further comprising:
determining, during a conversion between a current video block and a bitstream of the current video block, a reference sample for the current video block,
wherein when the current video block is coded with a coding mode using a reference block for prediction pointing to a same picture that the current video block is located in, the reference sample comprises the top-left and bottom-right sample of the current video block identified by a block vector of current video block.

17. The method of claim 1, wherein the conversion includes encoding the current video block into the bitstream.

18. The method of claim 1, wherein the conversion includes decoding the current video block from the bitstream.

19. An apparatus for processing video data comprising a processor and a non-transitory memory with instructions thereon, wherein the instructions upon execution by the processor, cause the processor to:
determine, during a conversion between a current video block and a bitstream of the current video block, a block vector for the current video block; and
perform, at least based on the block vector, the conversion,
wherein when the current video block is coded with a coding mode using a reference block for prediction pointing to a same picture that the current video block is located in, and the current video block is a first type of block, the block vector is derived from at least one second type of block, and
wherein a plurality of second type of blocks in a collocated region of the current video block are checked in an order based on a size or shape of the current video block to derive the block vector.

20. A non-transitory computer-readable recording medium storing a bitstream of a video which is generated by a method performed by a video processing apparatus, wherein the method comprises:
determining, a block vector for a current video block of the video; and
generating the bitstream based on the determining,
wherein when the current video block is coded with a coding mode using a reference block for prediction pointing to a same picture that the current video block is located in, and the current video block is a first type of block, the block vector is derived from at least one second type of block, and
wherein a plurality of second type of blocks in a collocated region of the current video block are checked in an order based on a size or shape of the current video block to derive the block vector.

* * * * *

UNITED STATES PATENT AND TRADEMARK OFFICE
CERTIFICATE OF CORRECTION

| | |
|---|---|
| PATENT NO. | : 11,825,030 B2 |
| APPLICATION NO. | : 17/353612 |
| DATED | : November 21, 2023 |
| INVENTOR(S) | : Jizheng Xu et al. |

It is certified that error appears in the above-identified patent and that said Letters Patent is hereby corrected as shown below:

On the Title Page

In the (30) Foreign Application Priority Data, delete:
"Dec. 2, 2018 (WO) ............ PCT/CN2018/122953"
And insert:
-- Dec. 22, 2018 (WO) ............ PCT/CN2018/122953 --, therefor.

Signed and Sealed this
Fourteenth Day of May, 2024

Katherine Kelly Vidal
*Director of the United States Patent and Trademark Office*